(12) United States Patent
Kelly

(10) Patent No.: US 10,833,865 B2
(45) Date of Patent: *Nov. 10, 2020

(54) BLOCKCHAIN-BASED METHOD AND SYSTEM FOR IMMUTABLE RESOURCE ALLOCATION IN A CLOUD COMPUTING ENVIRONMENT

(71) Applicant: Dell Products L.P., Hopkinton, MA (US)

(72) Inventor: John Kelly, Mallow Cork (IE)

(73) Assignee: Dell Products L.P., Hopkinton, MA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/966,381

(22) Filed: Apr. 30, 2018

(65) Prior Publication Data

US 2019/0334726 A1 Oct. 31, 2019

(51) Int. Cl.
*H04L 9/32* (2006.01)

(52) U.S. Cl.
CPC .......... *H04L 9/3239* (2013.01); *H04L 9/3247* (2013.01); *H04L 2209/38* (2013.01)

(58) Field of Classification Search
CPC .. H04L 9/3239; H04L 9/3247; H04L 2209/38
See application file for complete search history.

(56) References Cited

U.S. PATENT DOCUMENTS

| | | | |
|---|---|---|---|
| 2018/0137465 A1 | 5/2018 | Batra | |
| 2018/0216946 A1 | 8/2018 | Gueye | |
| 2018/0225660 A1 | 8/2018 | Chapman | |
| 2018/0276626 A1* | 9/2018 | Laiben | G06Q 20/0658 |
| 2018/0349706 A1* | 12/2018 | Hodgson | G06K 9/00744 |
| 2019/0087893 A1 | 3/2019 | Pellew | |
| 2019/0102850 A1 | 4/2019 | Wheeler | |
| 2019/0182254 A1* | 6/2019 | Christidis | H04L 63/1458 |
| 2019/0253250 A1 | 8/2019 | Bruner | |
| 2019/0268407 A1* | 8/2019 | Zeng | H04L 9/3247 |
| 2019/0289019 A1 | 9/2019 | Thekadath | |
| 2019/0303541 A1 | 10/2019 | Reddy | |
| 2019/0305932 A1 | 10/2019 | Townsend | |
| 2019/0318346 A1* | 10/2019 | Ben-David | G06Q 20/0658 |
| 2019/0325044 A1* | 10/2019 | Gray | G06F 16/284 |

(Continued)

OTHER PUBLICATIONS

Ethereum Homestead Documentation, Release 0.1, Ethereum community, Mar. 1, 2017. (127 pages).

(Continued)

*Primary Examiner* — Cheng-Feng Huang
(74) *Attorney, Agent, or Firm* — Chamberlain, Hrdlicka, White, Williams & Aughtry

(57) ABSTRACT

A blockchain-based method and system for immutable resource allocation in a cloud computing environment. Specifically, the method and system disclosed herein implement a marketplace solution which extends blockchain technology to the problem of information technology (IT) resources allocation in the cloud computing environment. In adapting blockchain technology, the method and system disclosed herein provide a mechanism for guaranteeing resource allocation without any implication of trust between resource providers and resource requestors or consumers.

19 Claims, 27 Drawing Sheets

(56) References Cited

U.S. PATENT DOCUMENTS

2019/0349426 A1* 11/2019 Smith .................. H04L 67/104

OTHER PUBLICATIONS

Covaci et al., NECTAR: Non-Interactive Smart Contract Protocol Using Blockchain Technology, NECTAR: Non-Interactive Smart Contract Protocol Using Blockchain Technology, 2018, 8, WETSEB Year: 2018 | Conference Paper.

Kim et al., Integrating Blockchain, Smart Contract-Tokens, and IoT to Design a Food Traceability Solution, Integrating Blockchain, Smart Contract-Tokens, and IoT to Design a Food Traceability Solution, 2018, 6, IEMCON Year: 2018 | Conference Paper.

* cited by examiner

BLOCKCHAIN-BASED METHOD AND SYSTEM FOR IMMUTABLE RESOURCE ALLOCATION IN A CLOUD COMPUTING ENVIRONMENT

BACKGROUND

As cloud computing paradigms become pervasive, the level of separation between consumers of information technology resources and the providers of those resources often increases.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-13, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessary imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a blockchain-based method and system for immutable resource allocation in a cloud computing environment. Specifically, one or more embodiments of the invention implement a marketplace solution which extends blockchain technology to the problem of information technology (IT) resources allocation in the cloud computing environment. In adapting blockchain technology, embodiments of the invention provides a mechanism for guaranteeing resource allocation without any implication of trust between resource providers and resource requestors or consumers.

Figure 1:
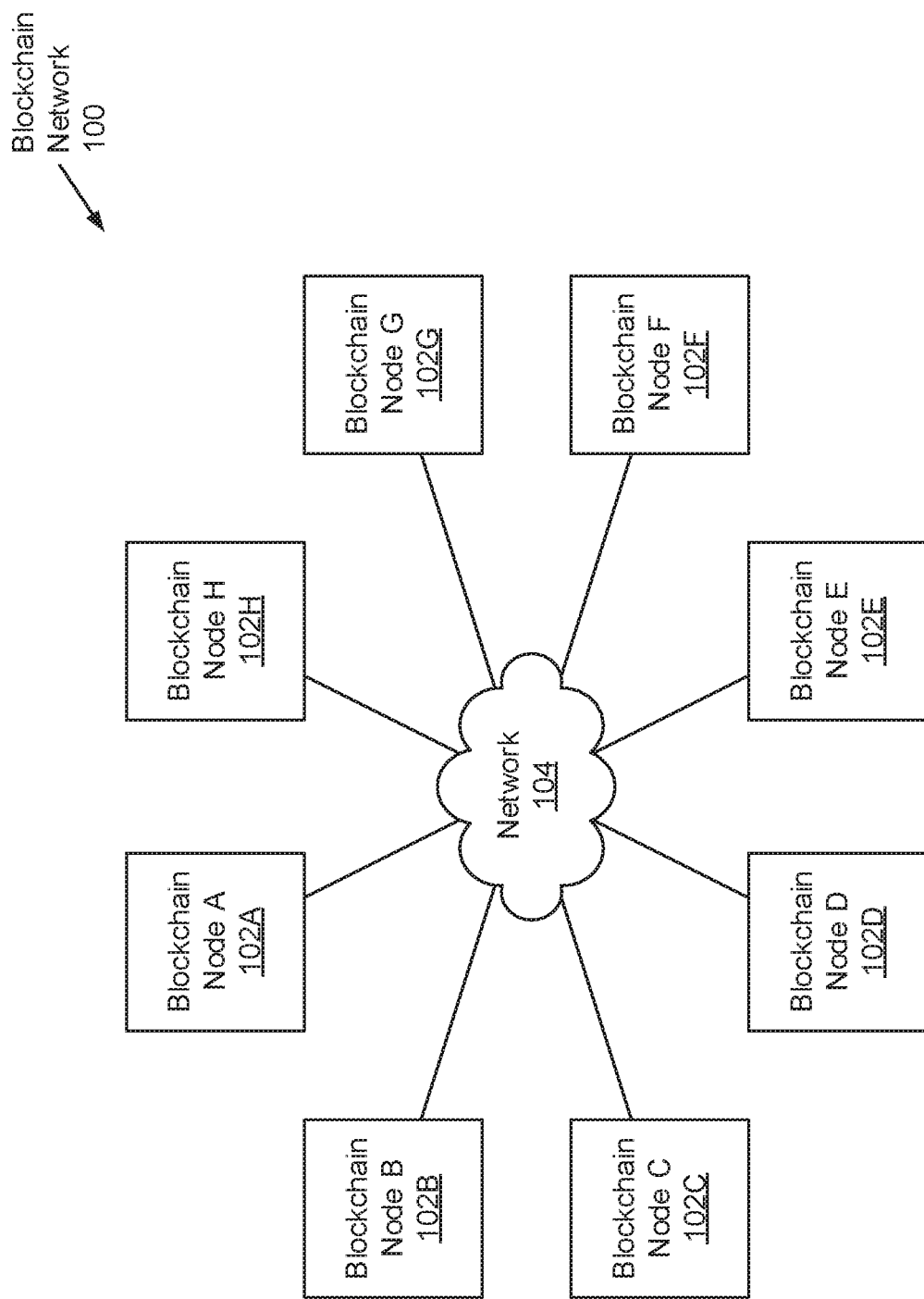
FIG. 1 shows a blockchain network in accordance with one or more embodiments of the invention.

FIG. 1 shows a blockchain network in accordance with one or more embodiments of the invention. A blockchain network (100) may refer to a decentralized peer-to-peer (p2p) network. In a decentralized p2p network, information may be distributed across and continually reconciled by various computing systems, instead of being maintained by a central authority. Subsequently, a decentralized p2p network may lack centralized points of vulnerability, which may be exploited, and, therefore, exhibits no central point of failure. In one embodiment of the invention, the blockchain network (100) may include multiple blockchain nodes (102A-102H) operatively connected to one another through a network (104). Each of these components is described below.

In one embodiment of the invention, a blockchain node (102A-102H) may be any computing system (see e.g., FIG. 13) that participates in implementing the blockchain network (100). Examples of a blockchain node (102A-102H) may include, but is not limited to: a desktop computer, a laptop computer, a smartphone, a tablet computer, a gaming console, a server, and a mainframe. Further, in participating in the implementation of the blockchain network (100), each blockchain node (102A-102H) may maintain a copy of a distributed database—i.e., a blockchain—which tracks transactions (described) between blockchain nodes (102A-102H). Moreover, each blockchain node (102A-102H) may play the role of a reserved resource provider (RRP), a reserved resource requestor (RRR), a blockchain block generator (BBG), a data feed service (DFS), or a combination thereof. Blockchain nodes (102A-102N) in reference to these aforementioned roles are described in further detail below with respect to FIGS. 2A-2D.

In one embodiment of the invention, the network (104) may refer to the interconnectivity between the various blockchain nodes (102A-102N), which enables communication, information exchange, and/or resource sharing. Examples of the network (104) may include, but is not limited to: a local area network (LAN), a wide area network (WAN) such as the Internet, and a mobile network. Further, the network (104) may be implemented using any combination of wired and/or wireless connections, which may employ any combination of wired and/or wireless communication protocols.

While FIG. 1 shows a configuration of components, other system configurations may be used without departing from the scope of the invention.

Figure 2A:
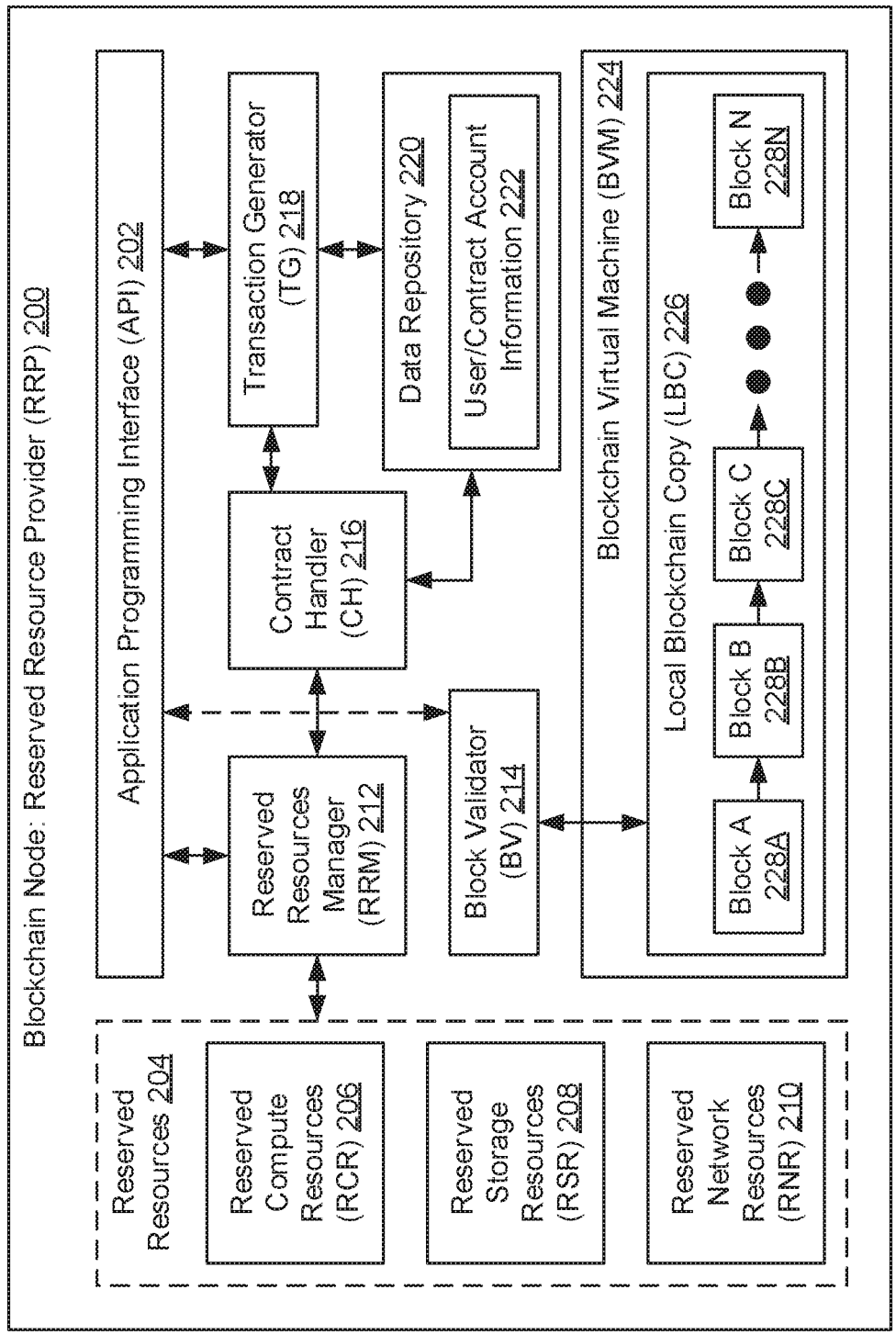
FIG. 2A shows a reserved resource provider in accordance with one or more embodiments of the invention.

FIG. 2A shows a reserved resource provider (RRP) in accordance with one or more embodiments of the invention. In the blockchain network, a RRP (200) may fulfill the role of offering reserved cloud environment resources in exchange for recompense. To that end, a RRP (200) may include an application programming interface (API) (202), reserved resources (204), a reserved resources manager (RRM) (212), a block validator (BV) (214), a contract handler (CH) (216), a transaction generator (TG) (218), a data repository (220), and a blockchain virtual machine (BVM) (224). Each of these components is described below.

In one embodiment of the invention, the API (202) may be a hardware and/or software implemented construct that employs a set of subroutine definitions, protocols, and/or tools for enabling communications, information exchange, and/or resource sharing between a RRP (200) and other blockchain nodes, apprising different roles, across the blockchain network. Further, the API (202) may include functionality to: receive API requests from another blockchain node; and defer processing of the API requests to one or more other components of the RRP (200)—e.g., the RRM (212), the BV (214), and the TG (218). One of ordinary skill will appreciate that the API (202) may perform other functionalities without departing from the scope of the invention. By way of an example, the API (202) may be a web API that may be accessed through an assigned web address (e.g., a uniform resource locator (URL)) and a WAN (e.g., Internet) connection.

In one embodiment of the invention, reserved resources (204) may refer to measurable quantities of cloud environment resources that a RRP (200) may be prepared to offer in exchange for recompense. Reserved resources (204) may encompass reserved compute resources (RCR) (206), reserved storage resources (RSR) (208), reserved network resources (RNR) (210), and/or reserved virtualization resources (RVR) (not shown). Each of these reserved resource types is described below.

In one embodiment of the invention, RCR (206) may refer to measurable quantities of a compute-relevant resource type that can be requested, allocated, and consumed. A compute-relevant resource type may pertain to a physical device (i.e., hardware), a logical intelligence (i.e., software), or a combination thereof, which provides some computing functionality or benefit to a blockchain node. Further, each compute-relevant resource type may be quantified through a respective based unit. By way of an example, a central processing unit (CPU) or a graphical processing unit (GPU) may be a compute-relevant resource type, which may be specified in base units of cores. By way of another example, memory may be another compute-relevant resource type, which may be specified in base units of bytes.

In one embodiment of the invention, RSR (208) may refer to measurable quantities of a storage-relevant resource type that can be requested, allocated, and consumed. A storage-relevant resource type may pertain to a physical device (i.e., hardware), a logical intelligence (i.e., software), or a combination thereof, which provides some storage functionality or benefit to a blockchain node. Further, each storage-relevant resource type may be quantified through a respective base unit. By way of examples, a hard disk drive (HDD), a solid state drive (SSD), and flash memory may each be a storage-relevant resource type, which may each be specified in base units of bytes.

In one embodiment of the invention, RNR (210) may refer to measurable quantities of a network-relevant resource type that can be requested, allocated, and consumed. A network-relevant resource type may pertain to physical device (i.e., hardware), a logical intelligence (i.e., software), or a combination thereof, which provides some networking functionality or benefit to a blockchain node. Further, each network-relevant resource type may be quantified through a respective base unit. By way of an example, a network interface card (NIC) or a network adapter may be a network-relevant resource type, which may be specified in base units of bits per second (bps).

In one embodiment of the invention, NVR (not shown) may refer to measurable quantities of a virtualization-relevant resource type that can be requested, allocated, and consumed. A virtualization-relevant resource type may pertain to physical device (i.e., hardware), a logical intelligence (i.e., software), or a combination thereof, which provides some virtualization functionality or benefit to a blockchain node. Further, each virtualization-relevant resource type may be quantified through a respective base unit. By way of an examples, a virtual machine and a container may each be a virtualization-relevant resource type, which may each be specified in base units of virtual CPUs (vCPU), where each vCPU may be viewed as the equivalent to a single physical CPU core.

In one embodiment of the invention, the RRM (212) may be a computer program or a computer process (i.e., an instance of a computer program) that executes on the underlying hardware of the RRP (200). Specifically, the RRM (212) may be a computer program/process tasked with managing the reserved resources (204) offered by the RRP (200). To that end, the RRM (212) may include functionality to: monitor or track levels pertaining to the reserved resources (204); allocate reserved resources (204) appropriately to one or more blockchain nodes based on received resource requests; and provide resource allocation information (described below) in response to queries based on the monitoring and allocation of the reserved resources (204).

In one embodiment of the invention, the BV (214) may be a computer program or a computer process (i.e., an instance of a computer program) that executes on the underlying hardware of the RRP (200). Specifically, the BV (214) may be a computer program/process tasked with validating proposed blocks. Proposed blocks (described below), when validated, become actual blocks that may be appended to the blockchain distributed across the blockchain network. To that end, the BV (214) may include functionality to: receive proposed blocks; and determine whether the proposed blocks are valid or invalid based on header information enclosed in the proposed blocks (see e.g., FIG. 9).

In one embodiment of the invention, the CH (216) may be a computer program or a computer process (i.e., an instance of a computer program) that executes on the underlying hardware of the RRP (200). Specifically, the CH (216) may be a computer program/process tasked with managing any processes involving smart contracts (described below) between the RRP (200) and other blockchain nodes. To that end, the CH (216) may include functionality to: generate smart contracts based on received resource requests; compile smart contracts into byte-code; and trigger the execution and/or fulfillment of smart contracts.

In one embodiment of the invention, the TG (218) may be a computer program or a computer process (i.e., an instance of a computer program) that executes on the underlying hardware of the RRP (200). Specifically, the TG (218) may be a computer program/process tasked with issuing various types of transactions. To that end, the TG (218) may include functionality to: generate token transfer transactions (TTTs) (see e.g., FIG. 5A); generate new contract transactions (NCTs) (see e.g., FIG. 5B); generate contract execution transactions (CETs) (see e.g., FIG. 5C); sign these various transaction types; and broadcast these various transaction types, via the API (202), to one or more peer blockchain nodes throughout the blockchain network.

In one embodiment of the invention, the data repository (220) may be a storage system or media for consolidating various forms of information pertinent to the RRP (200). The data repository (220) may be implemented across one or more physical and/or virtual storage units or devices, which may or may not be of the same type or co-located in a same computing system (see e.g., FIG. 13). Further, the information consolidated in the data repository (220) may be arranged using any storage mechanism (e.g., a filesystem, a database, a collection of tables, etc.). In one embodiment of the invention, the data repository (220) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, information consolidated in the data repository (220) may include, but is not limited to, user and/or contract account information (222). User account information may refer to a set of data objects or variables that pertain to a user of the blockchain network (i.e., an operator of a blockchain node). Further, user account information may enable a user to authenticate to the blockchain network, and is further described below with respect to FIG. 6A. On the other hand, contract account information may refer to a set of data objects or variables that pertain to a smart contract adopted by the blockchain network. Contract account information is described in further detail below with respect to FIG. 6B.

In one embodiment of the invention, the BVM (224) may be a runtime environment for smart contracts across the blockchain network. That is, the BVM (224) may be a sandboxed virtual stack machine responsible for executing smart contract byte-code, which may be obtained through the compilation of smart contracts. Further, the BVM (224) may also be employed for the execution of various transactions between blockchain nodes across the blockchain network. Towards executing smart contracts and/or transactions, the state, data, and/or computer readable program code for the smart contracts and/or transactions may be stored in a local blockchain copy (LBC) (226)—i.e., a local copy of the distributed database or ledger used throughout the blockchain network to track transactions. In one embodiment of the invention, the LBC (226) may refer to a data structure that may be replicated across the blockchain nodes of the blockchain network. Specifically, the LBC (226) may be a chain of blocks (228A-228N), where each block (228A-228N) represents a set of one or more transactions that have been vetted by the blockchain network. Blocks are described in further detail below with respect to FIG. 3.

Figure 2B:
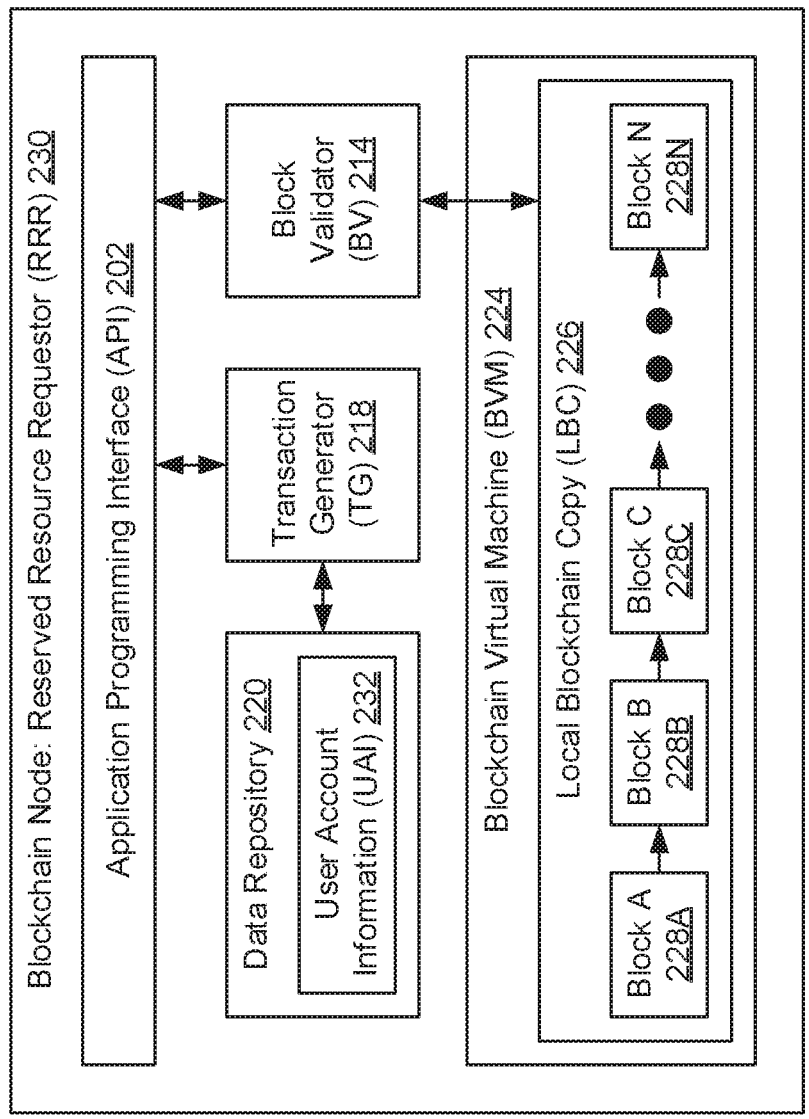
FIG. 2B shows a reserved resource requestor in accordance with one or more embodiments of the invention.

FIG. 2B shows a reserved resource requestor (RRR) in accordance with one or more embodiments of the invention. In the blockchain network, a RRR (230) may fulfill the role of requesting and consuming offered reserved cloud environment resources. To that end, a RRR (230) may include an application programming interface (API) (202), a block validator (BV) (214), a transaction generator (TG) (218), a data repository (220), and a blockchain virtual machine (BVM) (224). Each of these components is described below.

In one embodiment of the invention, the API (202) may be a hardware and/or software implemented construct that employs a set of subroutine definitions, protocols, and/or tools for enabling communications, information exchange, and/or resource sharing between a RRR (230) and other blockchain nodes, apprising different roles, across the blockchain network. Further, the API (202) may include functionality to: receive API requests from another blockchain node; and defer processing of the API requests to one or more other components of the RRR (230)—e.g., the BV (214), and the TG (218). One of ordinary skill will appreciate that the API (202) may perform other functionalities without departing from the scope of the invention. By way of an example, the API (202) may be a web API that may be accessed through an assigned web address (e.g., a uniform resource locator (URL)) and a WAN (e.g., Internet) connection.

In one embodiment of the invention, the BV (214) may be a computer program or a computer process (i.e., an instance of a computer program) that executes on the underlying hardware of the RRR (230). Specifically, the BV (214) may be a computer program/process tasked with validating proposed blocks. Proposed blocks (described below), when validated, become actual blocks that may be appended to the blockchain distributed across the blockchain network. To that end, the BV (214) may include functionality to: receive proposed blocks; and determine whether the proposed blocks are valid or invalid based on header information enclosed in the proposed blocks (see e.g., FIG. 9).

In one embodiment of the invention, the TG (218) may be a computer program or a computer process (i.e., an instance of a computer program) that executes on the underlying hardware of the RRR (230). Specifically, the TG (218) may be a computer program/process tasked with issuing various types of transactions. To that end, the TG (218) may include functionality to: generate token transfer transactions (TTTs) (see e.g., FIG. 5A); generate new contract transactions (NCTs) (see e.g., FIG. 5B); generate contract execution transactions (CETs) (see e.g., FIG. 5C); sign these various transaction types; and broadcast these various transaction types, via the API (202), to one or more peer blockchain nodes throughout the blockchain network.

In one embodiment of the invention, the data repository (220) may be a storage system or media for consolidating various forms of information pertinent to the RRR (230). The data repository (220) may be implemented across one or more physical and/or virtual storage units or devices, which may or may not be of the same type or co-located in a same computing system (see e.g., FIG. 13). Further, the information consolidated in the data repository (220) may be arranged using any storage mechanism (e.g., a filesystem, a database, a collection of tables, etc.). In one embodiment of the invention, the data repository (220) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, information consolidated in the data repository (220) may include, but is not limited to, user and/or contract account information (222). User account information may refer to a set of data objects or variables that pertain to a user of the blockchain network (i.e., an operator of a blockchain node). Further, user account information may enable a user to authenticate to the blockchain network, and is further described below with respect to FIG. 6A. On the other hand, contract account information may refer to a set of data objects or variables that pertain to a smart contract adopted by the blockchain network. Contract account information is described in further detail below with respect to FIG. 6B.

In one embodiment of the invention, the BVM (224) may be a runtime environment for smart contracts across the blockchain network. That is, the BVM (224) may be a sandboxed virtual stack machine responsible for executing smart contract byte-code, which may be obtained through the compilation of smart contracts. Further, the BVM (224) may also be employed for the execution of various transactions between blockchain nodes across the blockchain network. Towards executing smart contracts and/or transactions, the state, data, and/or computer readable program code for the smart contracts and/or transactions may be stored in a local blockchain copy (LBC) (226)—i.e., a local copy of the distributed database or ledger used throughout the blockchain network to track transactions. In one embodiment of the invention, the LBC (226) may refer to a data structure that may be replicated across the blockchain nodes of the blockchain network. Specifically, the LBC (226) may be a chain of blocks (228A-228N), where each block (228A-228N) represents a set of one or more transactions that have been vetted by the blockchain network. Blocks are described in further detail below with respect to FIG. 3.

Figure 2C:
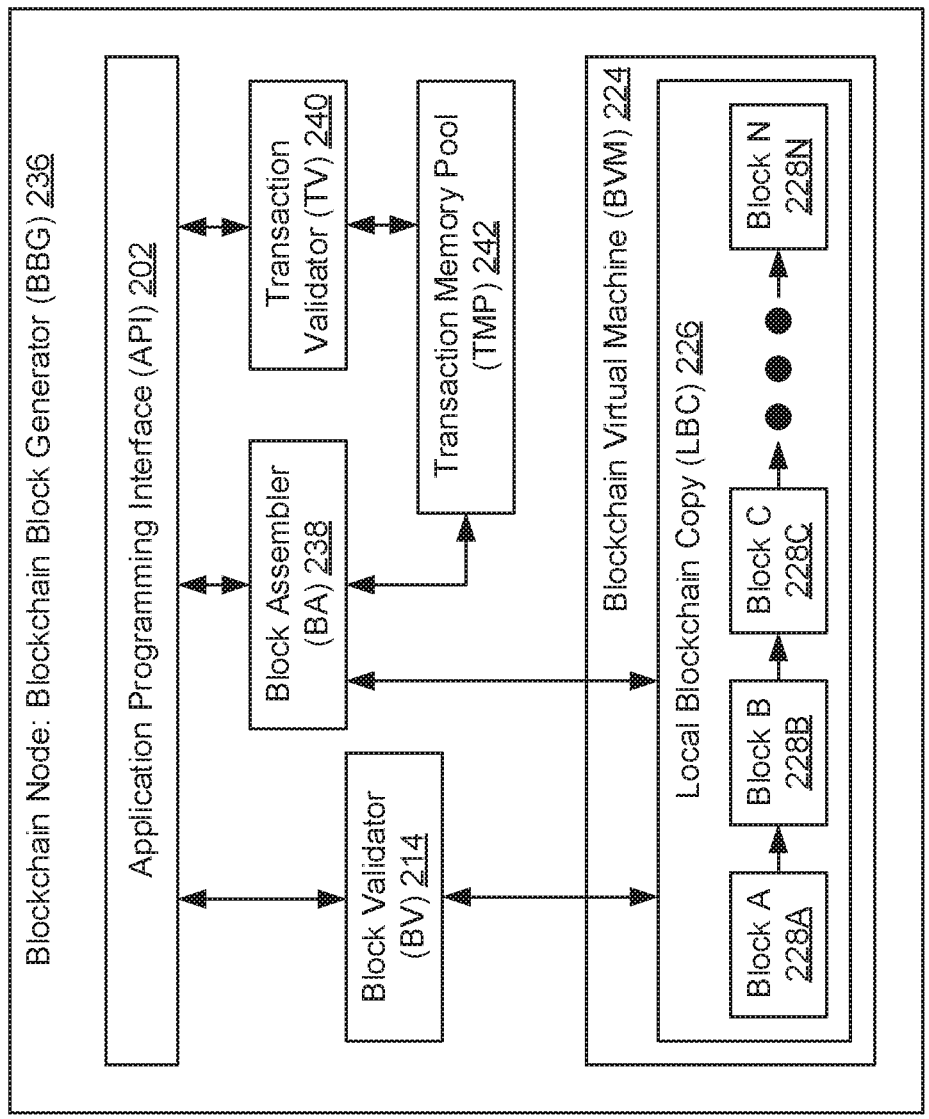
FIG. 2C shows a blockchain block generator in accordance with one or more embodiments of the invention.

FIG. 2C shows a blockchain block generator (BBG) in accordance with one or more embodiments of the invention. In the blockchain network, a BBG (236) may fulfill the role of generating proposed blocks, which may or may not be confirmed into or appended onto the distributed blockchain (i.e., the LBC (226)) replicated throughout the blockchain network. To that end, a BBG (236) may include an application programming interface (API) (202), a block validator (BV) (214), a block assembler (BA) (238), a transaction validator (TV) (240), a transaction memory pool (TMP) (242), and a blockchain virtual machine (BVM) (224). Each of these components is described below.

In one embodiment of the invention, the API (202) may be a hardware and/or software implemented construct that employs a set of subroutine definitions, protocols, and/or tools for enabling communications, information exchange, and/or resource sharing between a BBG (236) and other blockchain nodes, apprising different roles, across the blockchain network. Further, the API (202) may include functionality to: receive API requests from another blockchain node; and defer processing of the API requests to one or more other components of the BBG (236)—e.g., the BV (214), BA (238), and the TV (240). One of ordinary skill will appreciate that the API (202) may perform other functionalities without departing from the scope of the invention. By way of an example, the API (202) may be a web API that may be accessed through an assigned web address (e.g., a uniform resource locator (URL)) and a WAN (e.g., Internet) connection.

In one embodiment of the invention, the BV (214) may be a computer program or a computer process (i.e., an instance of a computer program) that executes on the underlying hardware of the BBG (236). Specifically, the BV (214) may be a computer program/process tasked with validating proposed blocks. Proposed blocks (described below), when validated, become actual blocks that may be appended to the blockchain distributed across the blockchain network. To that end, the BV (214) may include functionality to: receive proposed blocks; and determine whether the proposed blocks are valid or invalid based on header information enclosed in the proposed blocks (see e.g., FIG. 9).

In one embodiment of the invention, the BA (238) may be a computer program or a computer process (i.e., an instance of a computer program) that executes on the underlying hardware of the BBG (236). Specifically, the BA (238) may be a computer program/process tasked with assembling proposed blocks. To that end, the BA (238) may include functionality to: select unconfirmed transactions from the TMP (242); generate proposed blocks using or based on at least the selected unconfirmed transactions; and perform the validation of the selected unconfirmed transactions towards appending the proposed blocks onto the blockchain. Furthermore, in validating the unconfirmed transactions, the BA (238) may employ one or more consensus algorithms—examples of which include, but are not limited to, the proof-of-work (PoW) consensus model and the proof-of-stake (PoS) consensus model. In brief, the PoW consensus model relies on the computing power of a blockchain node to secure a reward for participating in a consensus process to validate the unconfirmed transactions, whereas the PoS consensus model alternatively relies on the stake, or the number of tokens, that a blockchain node owns in the blockchain network to secure the reward.

In one embodiment of the invention, the TV (240) may be a computer program or a computer process (i.e., an instance of a computer program) that executes on the underlying hardware of the BBG (236). Specifically, the TV (240) may be a computer program/process tasked with authenticating unconfirmed transactions. To that end, the TV (240) may include functionality to: receive unconfirmed transactions, which may have been broadcasted across the blockchain network by one or more blockchain nodes; determine whether the unconfirmed transactions are authentic based on digital signatures and user encryption keys; and store or discard the unconfirmed transactions based on the aforementioned determination.

In one embodiment of the invention, the TMP (242) may be a storage system or media for consolidating authenticated, unconfirmed transactions. The TMP (242) may be implemented across one or more physical and/or virtual storage units or devices, which may or may not be of the same type or co-located in a same computing system (see e.g., FIG. 13). Further, the information consolidated in the TMP (242) may be arranged using any storage mechanism (e.g., a filesystem, a database, a collection of tables, etc.). In one embodiment of the invention, the TMP (242) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the BVM (224) may be a runtime environment for smart contracts across the blockchain network. That is, the BVM (224) may be a sandboxed virtual stack machine responsible for executing smart contract byte-code, which may be obtained through the compilation of smart contracts. Further, the BVM (224) may also be employed for the execution of various transactions between blockchain nodes across the blockchain network. Towards executing smart contracts and/or transactions, the state, data, and/or computer readable program code for the smart contracts and/or transactions may be stored in a local blockchain copy (LBC) (226)—i.e., a local copy of the distributed database or ledger used throughout the blockchain network to track transactions. In one embodiment of the invention, the LBC (226) may refer to a data structure that may be replicated across the blockchain nodes of the blockchain network. Specifically, the LBC (226) may be a chain of blocks (228A-228N), where each block (228A-228N) represents a set of one or more transactions that have been vetted by the blockchain network. Blocks are described in further detail below with respect to FIG. 3.

Figure 2D:
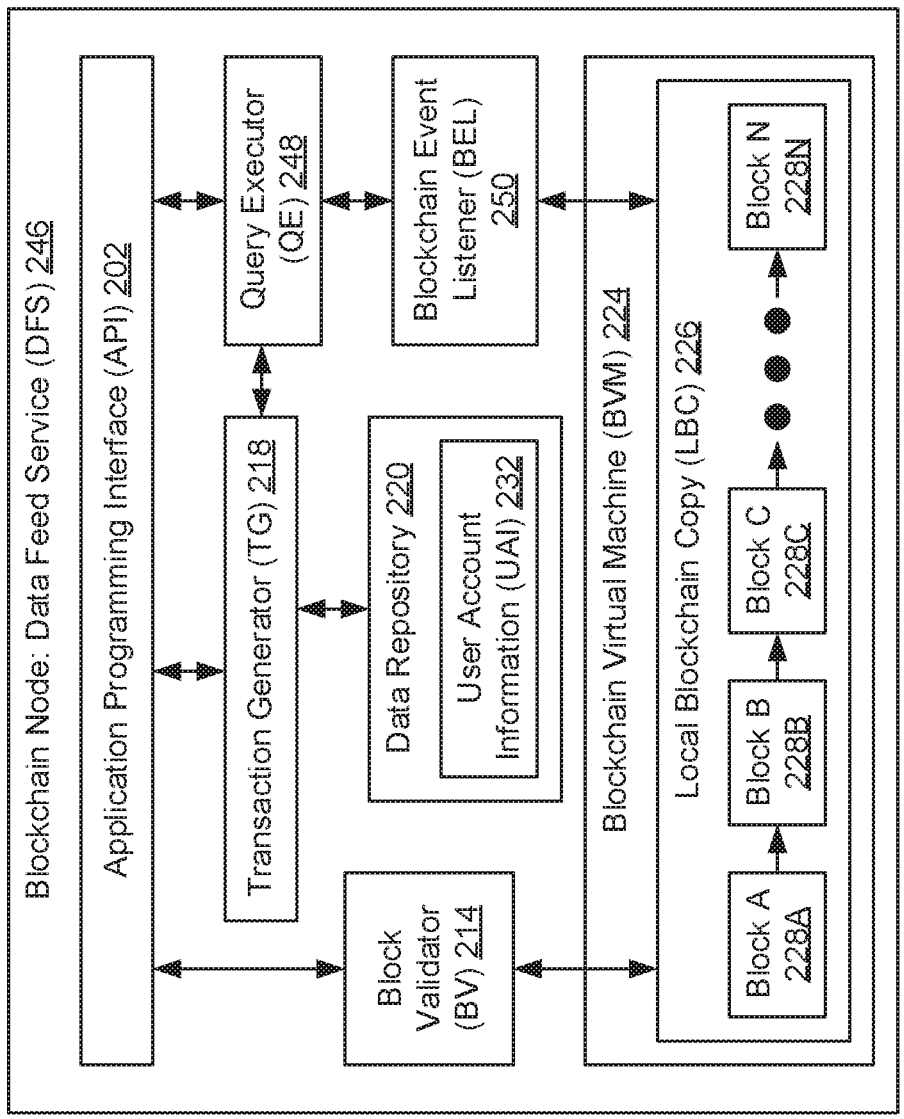
FIG. 2D shows a data feed service in accordance with one or more embodiments of the invention.

FIG. 2D shows an data feed service (DFS) in accordance with one or more embodiments of the invention. In the blockchain network, a DFS (246) may fulfill the role of a data feed service, which may be employed by smart contracts to submit queries. To that end, a DFS (246) may include an application programming interface (API) (202), a block validator (BV) (214), a transaction generator (TG) (218), a data repository (220), a query executor (QE) (248), a blockchain event listener (BEL) (250), and a blockchain virtual machine (BVM) (224). Each of these components is described below.

In one embodiment of the invention, the API (202) may be a hardware and/or software implemented construct that employs a set of subroutine definitions, protocols, and/or tools for enabling communications, information exchange, and/or resource sharing between a DFS (246) and other blockchain nodes, apprising different roles, across the blockchain network. Further, the API (202) may include functionality to: receive API requests from another blockchain node; and defer processing of the API requests to one or more other components of the DFS (246)—e.g., the BV (214), the TG (218), and the QE (248). One of ordinary skill will appreciate that the API (202) may perform other functionalities without departing from the scope of the invention. By way of an example, the API (202) may be a web API that may be accessed through an assigned web address (e.g., a uniform resource locator (URL)) and a WAN (e.g., Internet) connection.

In one embodiment of the invention, the BV (214) may be a computer program or a computer process (i.e., an instance of a computer program) that executes on the underlying hardware of the DFS (246). Specifically, the BV (214) may be a computer program/process tasked with validating proposed blocks. Proposed blocks (described below), when validated, become actual blocks that may be appended to the blockchain distributed across the blockchain network. To that end, the BV (214) may include functionality to: receive proposed blocks; and determine whether the proposed blocks are valid or invalid based on header information enclosed in the proposed blocks (see e.g., FIG. 9).

In one embodiment of the invention, the TG (218) may be a computer program or a computer process (i.e., an instance of a computer program) that executes on the underlying hardware of the DFS (246). Specifically, the TG (218) may be a computer program/process tasked with issuing various types of transactions. To that end, the TG (218) may include functionality to: generate token transfer transactions (TTTs) (see e.g., FIG. 5A); generate new contract transactions (NCTs) (see e.g., FIG. 5B); generate contract execution transactions (CETs) (see e.g., FIG. 5C); sign these various transaction types; and broadcast these various transaction types, via the API (202), to one or more peer blockchain nodes throughout the blockchain network.

In one embodiment of the invention, the data repository (220) may be a storage system or media for consolidating various forms of information pertinent to the DFS (246). The data repository (220) may be implemented across one or more physical and/or virtual storage units or devices, which may or may not be of the same type or co-located in a same computing system (see e.g., FIG. 13). Further, the information consolidated in the data repository (220) may be arranged using any storage mechanism (e.g., a filesystem, a database, a collection of tables, etc.). In one embodiment of the invention, the data repository (220) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, information consolidated in the data repository (220) may include, but is not limited to, user account information (UAI) (232). UAI may refer to a set of data objects or variables that pertain to a user of the blockchain network (i.e., an operator of a blockchain node). Further, user account information may enable a user to authenticate to the blockchain network, and is further described below with respect to FIG. 6A.

In one embodiment of the invention, the QE (248) may be a computer program or a computer process (i.e., an instance of a computer program) that executes on the underlying hardware of the DFS (246). Specifically, the QE (248) may be a computer program/process tasked with issuing data requests to one or more data sources. To that end, the QE (248) may include functionality to: obtaining information respective to smart contract queries from the BEL (250)—i.e., a data query type, a data source, and a data query; generate data requests using at least the data query type and data query; transmit the data requests to the data source; receive responses, specifying query returned data, from the data source; and provide the query returned data to the TG (218).

In one embodiment of the invention, the BEL (250) may be a computer program or a computer process (i.e., an instance of a computer program) that executes on the underlying hardware of the DFS (246). Specifically, the BEL (250) may be a computer program/process tasked with monitoring the blockchain—i.e., the LBC (226)—for blockchain events produced through the execution of smart contracts. To that end, the BEL (250) may include functionality to: listen for and detect blockchain events; obtain information respective to smart contract queries (mentioned above) based on the detected blockchain events; and provide the aforementioned information to the QE (248).

In one embodiment of the invention, the BVM (224) may be a runtime environment for smart contracts across the blockchain network. That is, the BVM (224) may be a sandboxed virtual stack machine responsible for executing smart contract byte-code, which may be obtained through the compilation of smart contracts. Further, the BVM (224) may also be employed for the execution of various transactions between blockchain nodes across the blockchain network. Towards executing smart contracts and/or transactions, the state, data, and/or computer readable program code for the smart contracts and/or transactions may be stored in a local blockchain copy (LBC) (226)—i.e., a local copy of the distributed database or ledger used throughout the blockchain network to track transactions. In one embodiment of the invention, the LBC (226) may refer to a data structure that may be replicated across the blockchain nodes of the blockchain network. Specifically, the LBC (226) may be a chain of blocks (228A-228N), where each block (228A-228N) represents a set of one or more transactions that have been vetted by the blockchain network. Blocks are described in further detail below with respect to FIG. 3.

Figure 3:
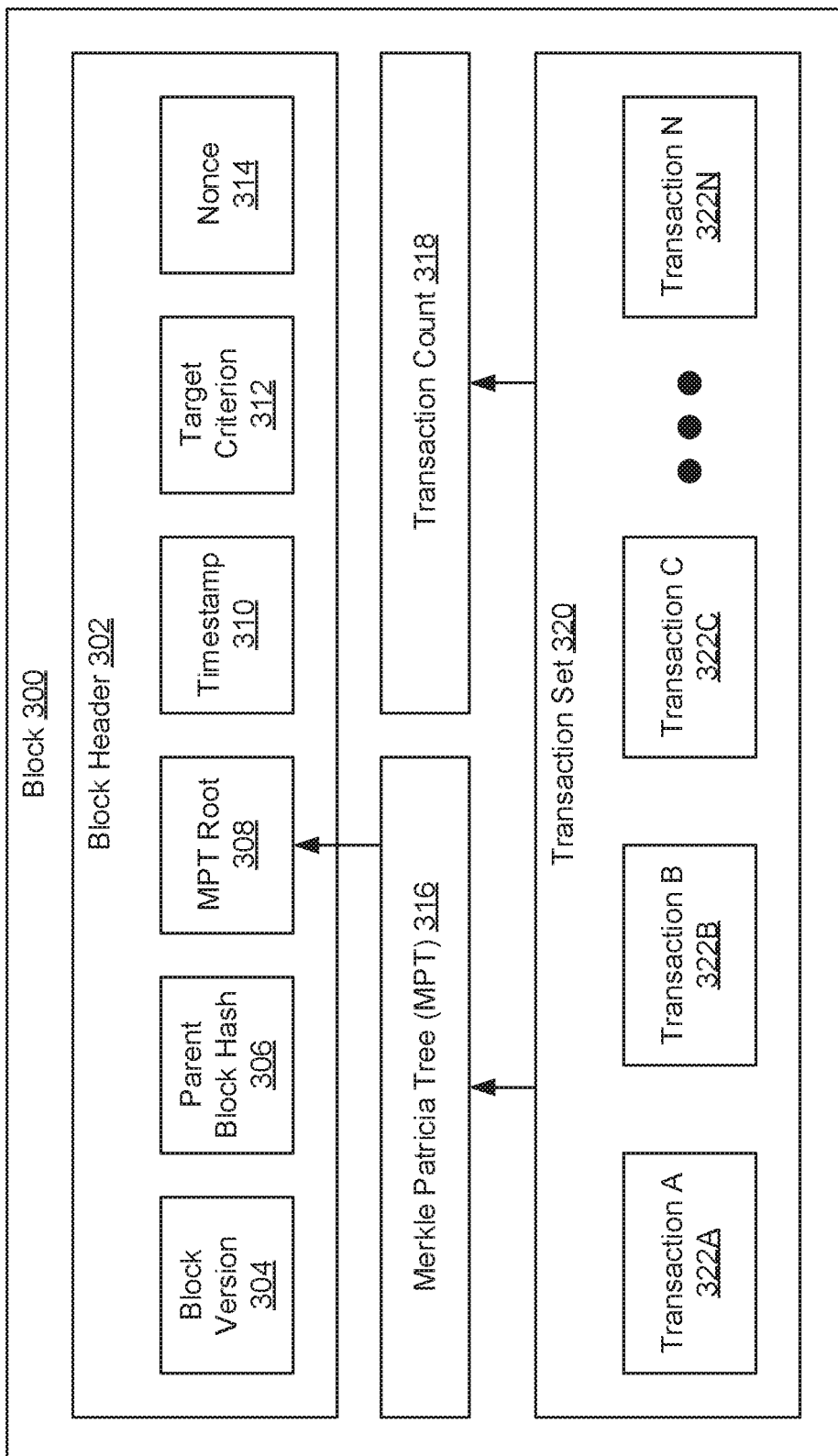
FIG. 3 shows a block in accordance with one or more embodiments of the invention.

FIG. 3 shows a block in accordance with one or more embodiments of the invention. A block (300) (or a proposed block) may be a data object or structure that holds at least a set of one or more confirmed (or unconfirmed) transactions. Further, a block (300) (or a proposed block) may include a block header (302), a Merkle-Patricia tree (MPT) (316), a transaction count (318), and a transaction set (320). Each of these components is described below.

In one embodiment of the invention, the block header (302) may be a data structure nested within the block (300), which specifies metadata pertaining to the block (300). The metadata specified in the block header (302) may include, but is not limited to: a block version (304), a parent block hash (306), a MPT root (308), a timestamp (310), a target criterion (312), and a nonce (314). Each of these metadata items are described below.

In one embodiment of the invention, the block version (304) may be a numeric value that indicates which set of block validation rules to follow. Further, the block version (304) may be used to track upgrades and changes in the blockchain network protocol. In one embodiment of the invention, the parent block hash (306) may be an alphanumeric character string that represents a hash of the block header of the previous or parent block in the blockchain. To obtain the hash of a block header (302), some or all metadata specified in the block header (302) may be fed through a hashing or cryptographic function (e.g., Secure Hash Algorithm (SHA)-256). Further, the parent block hash (306) may serve as a link into the previous/parent block, thus securing the chain of blocks constituting the blockchain. Moreover, the parent block hash (306) may further ensure that no previous block in the blockchain can be changed without also changing the block header (302) of the current block (300).

In one embodiment of the invention, the MPT root (308) may be an alphanumeric character string that represents a hash of the root node of the MPT (316) (described below). The root node of the MPT (316) may refer to the descendant node from all hashed pairs of transactions—i.e., the transaction set (320)—specified in the block (300). Further, the MPT root (308) may ensure that none of the transactions in the transaction set (320) can be modified without modifying the block header (302). In one embodiment of the invention, the timestamp (310) may be a numeric value that encodes time information pertaining to the creation date and/or time of the block (300).

In one embodiment of the invention, the target criterion (312) may refer to a difficulty target for the block (300). Specifically, when a hashing of the block header (302) for the block (300) meets the condition specified by the target criterion (312), the block (300) and, accordingly, the transaction set (320) therein, may be considered valid and, subsequently, may be appended onto the blockchain. In one embodiment of the invention, the nonce (314) may be a numeric value that may be dynamically changed by blockchain block generator (BBG) nodes (see e.g., FIG. 2C) to produce variations of the block header (302), which when fed through a hashing function, yields different hashes. BBG nodes may repeatedly expend compute resources towards deriving an appropriate block header (302) hash, which specifies a correct nonce (314) value. An appropriate block header (302) hash may permit a BBG node to satisfy the target criterion (312) specified for the block (300), thereby allowing the BBG node to collect the reward associated with correctly validating the block (300) and/or transaction set (320) therein.

In one embodiment of the invention, the MPT (316) may be a data structure that resembles a binary tree that encompasses hashes. More precisely, the MPT (316) may be a binary hash tree. The architecture of the MPT (316) is described in further detail below with respect to FIG. 4. Furthermore, the MPT (316) may serve as an efficient and secure mechanism for verifying (or otherwise authenticating) the contents of potentially large data structures such as, for example, the transaction set (320). In one embodiment of the invention, the transaction count (318) may be a numeric value that indicates a cardinality of the transaction set (320)—i.e., a number of transactions (322A-322N) specified in the transaction set (320).

In one embodiment of the invention, the transaction set (320) may refer to a data object or structure (i.e., a logical container) that specifies one or more transactions (322A-322N). Generally, a transaction (322A-322N) may refer to an exchange or interaction between blockchain nodes. Further, a transaction (322A-322N), when executed, may update the state of the blockchain. In this disclosure, three transaction types are disclosed: a token transfer transaction (TTT), a new contract transaction (NCT), and a contract execution transaction (CET), which are described in further detail below with respect to FIGS. 5A-5C, respectively. Moreover, in one embodiment of the invention, a transaction (322A-322N) may be a confirmed transaction or an unconfirmed transaction. A confirmed transaction refers to a transaction (322A-322N) that has been vetted through a consensus algorithm—e.g., proof-of-work (PoW), proof-of-stake (PoS), etc. On the other hand, an unconfirmed transaction refers to a transaction (322A-322N) that has been broadcasted across the blockchain network, however, has yet to be vetted.

Figure 4:
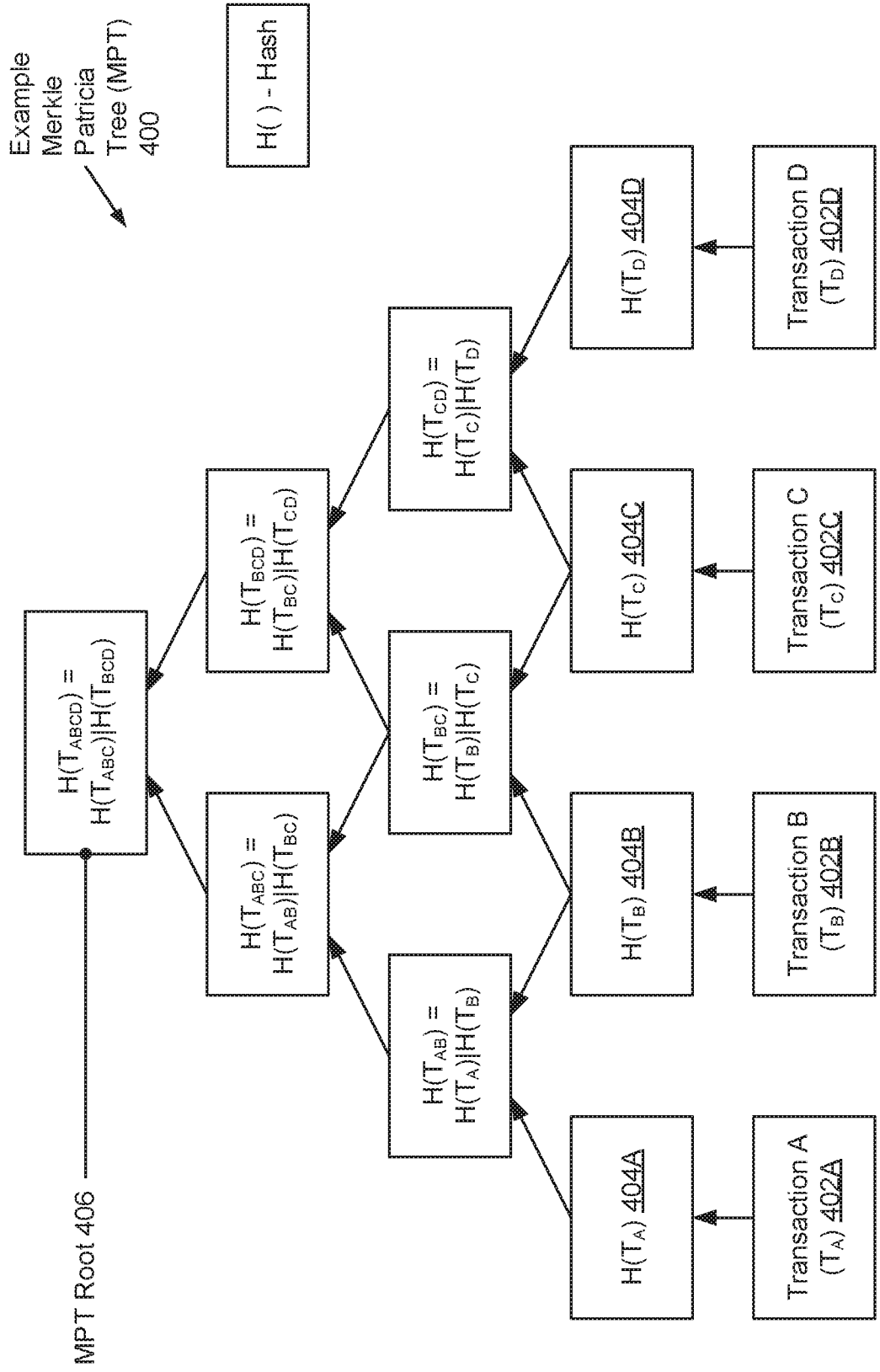
FIG. 4 shows an example Merkle-Patricia tree in accordance with one or more embodiments of the invention.

FIG. 4 shows an example Merkle-Patricia tree (MPT) in accordance with one or more embodiments of the invention. As described above, a MPT (400) may be a binary tree data structure in which each node exhibits at most two children. Further, each node is representative of a cryptographic hash of either a transaction (e.g., leaf nodes $H(T_A)$ (404A), $H(T_B)$ (404B), $H(T_C)$ (404C), and $H(T_D)$ (404D)) or a concatenation of its child nodes (e.g., non-leaf nodes $H(T_{AB})$, $H(T_{BC})$, $H(T_{CD})$, etc.). The topmost node in the MPT (400) is the MPT root (406), which represents the aggregated cryptographic hash for all transactions specified in the transaction set of a block.

Figure 5C:
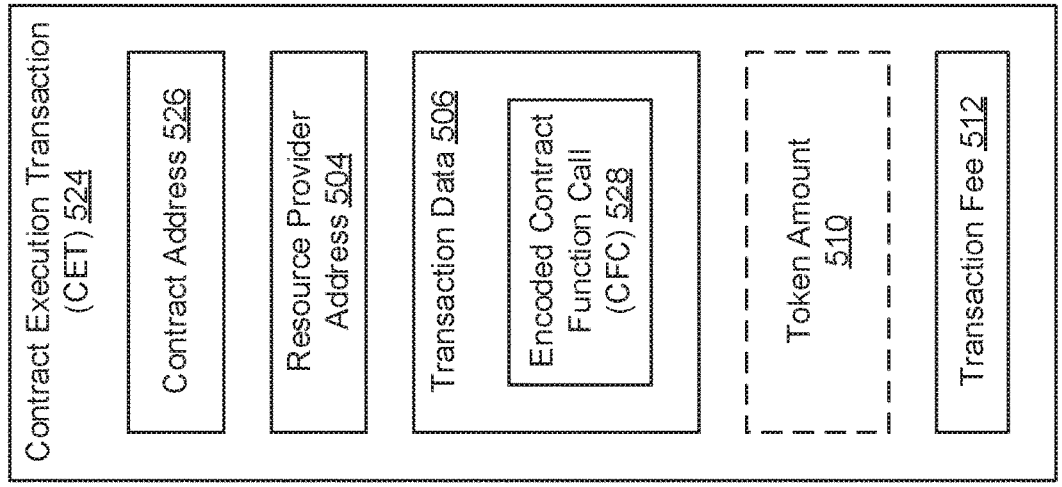
FIG. 5C shows a contract execution transaction in accordance with one or more embodiments of the invention.
Figure 5B:
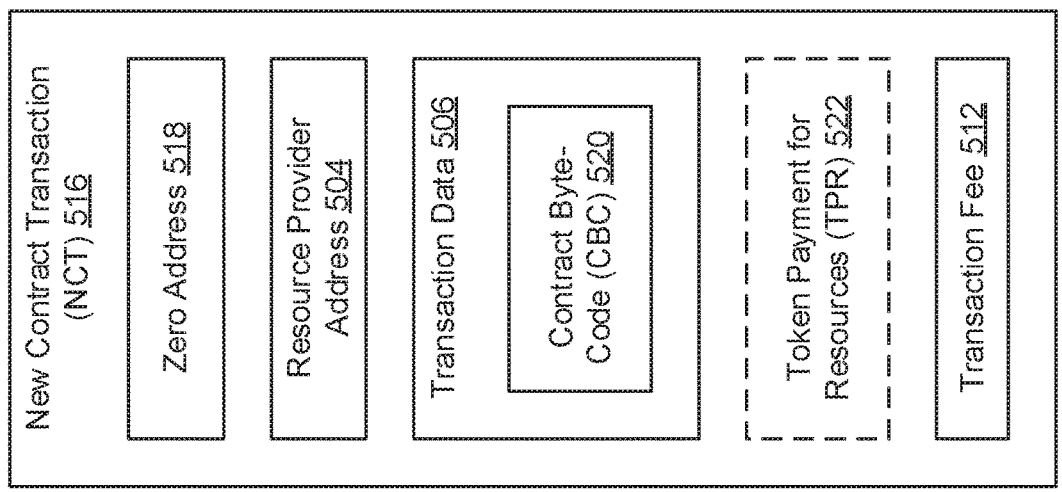
FIG. 5B shows a new contract transaction in accordance with one or more embodiments of the invention.
Figure 5A:
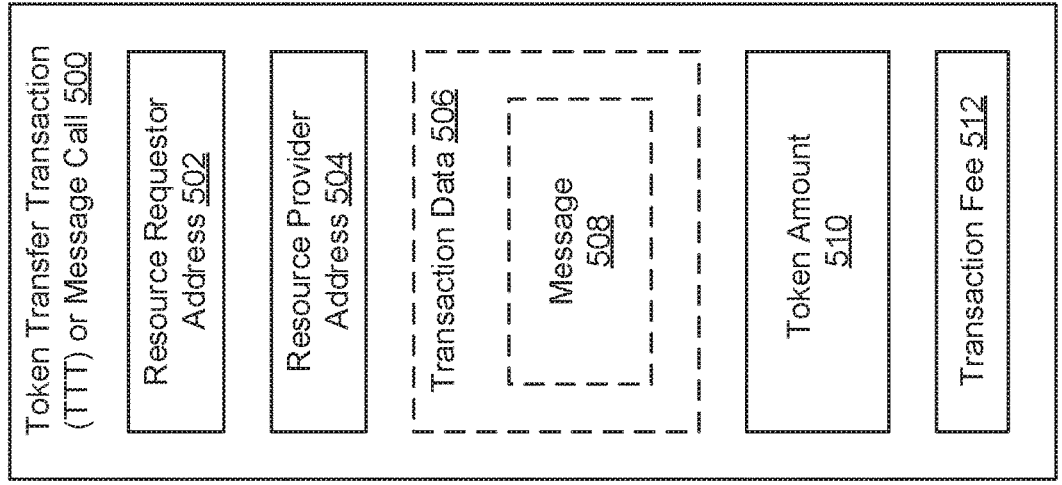
FIG. 5A shows a token transfer transaction in accordance with one or more embodiments of the invention.

FIG. 5A shows a token transfer transaction (TTT) in accordance with one or more embodiments of the invention.

A TTT (500) may refer to a transaction type that serves to transfer tokens (i.e., a digital currency of the blockchain network) between blockchain node users. Another designation for the TTT (500) may be a message call. Further, a TTT (500) may include, but is not limited to: a resource requestor address (502), a resource provider address (504), transaction data (506) (optionally), a token amount (510), and a transaction fee (512). Each of these components is described below.

In one embodiment of the invention, the resource requestor address (502) may refer to a unique identifier directed to a resource requesting user account. In turn, a resource requesting user account may be associated with a blockchain network user, lying behind a blockchain node—i.e., a reserved resource requestor (RRR) (see e.g., FIG. 2B), which may procure cloud environment resources. Further, in one embodiment of the invention, the resource provider address (504) may refer to a unique identifier directed to a resource providing user account. A resource providing user account may be associated with a blockchain network user, lying behind a blockchain node—i.e., a reserved resource provider (RRP) (see e.g., FIG. 2A), which may offer cloud environment resources in exchange for recompense.

In one embodiment of the invention, the transaction data (506) may refer to an all-purpose field wherein data may be attached. In the case of a TTT (500), in one embodiment of the invention, the transaction data (506) field may be left empty or unused. In another embodiment of the invention, the transaction data (506) field may enclose a message (508) exchanged between blockchain node users—i.e., the resource requestor and the resource provider. By way of an example, the message (508) may encompass a brief remark or memo that may describe the transaction. Furthermore, in one embodiment of the invention, the token amount (510) may refer to a specified quantity of tokens (or digital currency) being exchanged between blockchain node users. Moreover, the transaction fee (512) may refer to a reward, expressed in tokens, which incentivizes a blockchain block generator (BBG) (see e.g., FIG. 2C) to: select the transaction; generate a proposed block encompassing at least the transaction; and validate the proposed block to confirm the transaction into the blockchain.

FIG. 5B shows a new contract transaction (NCT) in accordance with one or more embodiments of the invention. A NCT (516) may refer to a transaction type that serves to create a smart contract. A smart contract may be a computer program that may be stored on the blockchain and, further, specifies contractual terms for the exchange of reserved resources for recompense between blockchain node users. A smart contract may also include functionality to enforce the contractual terms specified therein. In one embodiment of the invention, a NCT (516) may include, but is not limited to: a zero address (518), a resource provider address (504), transaction data (506), a token payment for resources (TPR) (522) (optionally), and a transaction fee (512). Each of these components is described below.

In one embodiment of the invention, the zero address (518) may be a unique identifier, often expressed as an empty character string, which triggers the creation of a smart contract. Further, as described above, the resource provider address (504) may refer to a unique identifier directed to a resource providing user account. A resource providing user account may be associated with a blockchain network user, lying behind a blockchain node—i.e., a reserved resource provider (RRP) (see e.g., FIG. 2A), which may offer cloud environment resources in exchange for recompense.

In one embodiment of the invention, the transaction data (506) for a NCT (516) may take form as contract byte-code (CBC) (520). Specifically, the CBC (520) may represent compiled computer readable program code, which pertains to the smart contract being created. The CBC (520) may also refer to byte-code that the blockchain virtual machine (BVM), residing on each blockchain node, can interpret and subsequently execute. Upon confirmation of a block that encompasses the NCT (500) into the blockchain, the BVM on each blockchain node may execute the CBC (520) specified in the NCT (500) to create a smart contract that may be distributed across the blockchain network.

In one embodiment of the invention, the optional TPR (522) may refer to a specified quantity of tokens (or digital currency) being exchanged between blockchain node users. Specifically, the TPR (522) may represent a recompense amount, from a resource requesting blockchain node and/or user, which may be directed to procuring reserved computing environment resources offered by a resource providing blockchain node and/or user. Moreover, the transaction fee (512) may refer to a reward, expressed in tokens, which incentivizes a blockchain block generator (BBG) (see e.g., FIG. 2C) to: select the transaction; generate a proposed block encompassing at least the transaction; and validate the proposed block to confirm the transaction into the blockchain.

FIG. 5C shows a contract execution transaction (CET) in accordance with one or more embodiments of the invention. A CET (524) may refer to transaction type that serves to call or execute an already created smart contract. Accordingly, a CET (524) may include, but is not limited to: a contract address (526), a resource provider address (504), transaction data (506), a token amount (510) (optionally), and a transaction fee (512). Each of these components is described below.

In one embodiment of the invention, the contract address (526) may refer to a unique identifier directed to a smart contract account. A smart contract account may be associated with an already created smart contract stored in the blockchain. Further, as described above, the resource provider address (504) may refer to a unique identifier directed to a resource providing user account. A resource providing user account may be associated with a blockchain network user, lying behind a blockchain node—i.e., a reserved resource provider (RRP) (see e.g., FIG. 2A), which may offer cloud environment resources in exchange for recompense.

In one embodiment of the invention, the transaction data (506) for a CET (524) may take form as an encoded contract function call (CFC) (528). A CFC may be an expression that passes control, along with one or more arguments/parameters, to a subroutine of an already created smart contract. By way of an example, assuming a smart contract includes a subroutine or function named "myFunction", which may specify a set of instructions to perform a task, and that requires a first parameter "param1" and a second parameter "param2": a respective CFC directed to calling the subroutine may resemble the expression "myFunction(param1, param2)" By way of another example, if the aforementioned subroutine were to return any value, where the returned value can be stored in a defined variable "myValue": a respective CFC directed to calling the subroutine may resemble the expression "myValue=myFunction(param1, param2)". Furthermore, an encoded CFC (528) may refer to a hex-encoded conversion of the aforementioned expression—i.e., a CFC expressed as a hexadecimal character string.

In one embodiment of the invention, the optional token amount (510) may refer to a specified quantity of tokens (or digital currency) that may be required, by the already created smart contract, to perform a service. By way of an example, the service may be directed to querying an external data feed—i.e., an data feed service (DFS) (see e.g., FIG. 2D)— for information that the already created smart contract may use to fulfill and/or enforce the contractual terms specified therein. In one embodiment of the invention, as described above, the transaction fee (512) may refer to a reward, expressed in tokens, which incentivizes a blockchain block generator (BBG) (see e.g., FIG. 2C) to: select the transaction; generate a proposed block encompassing at least the transaction; and validate the proposed block to confirm the transaction into the blockchain.

Figure 6B:
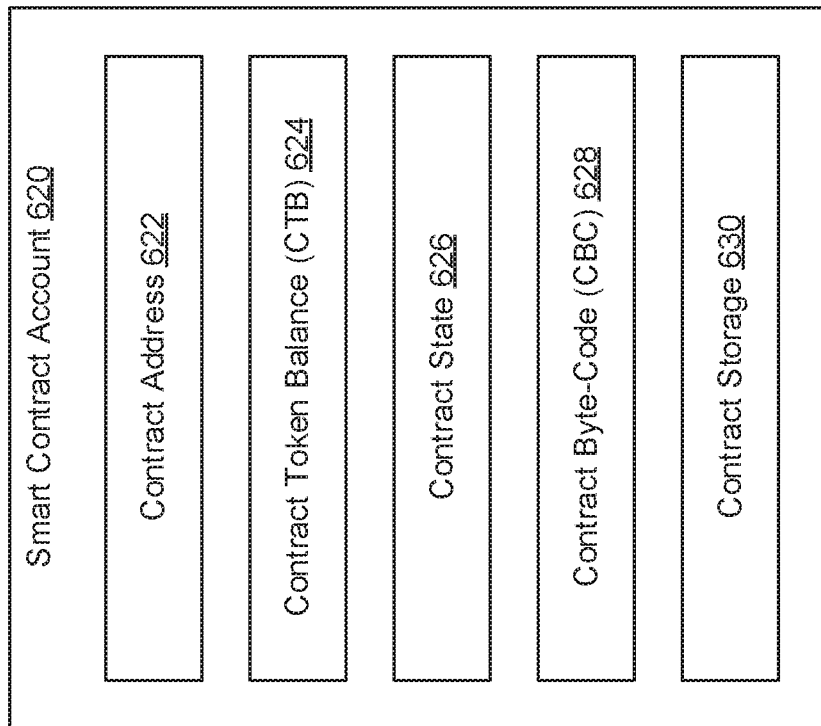
FIG. 6B shows a smart contract account in accordance with one or more embodiments of the invention.
Figure 6A:
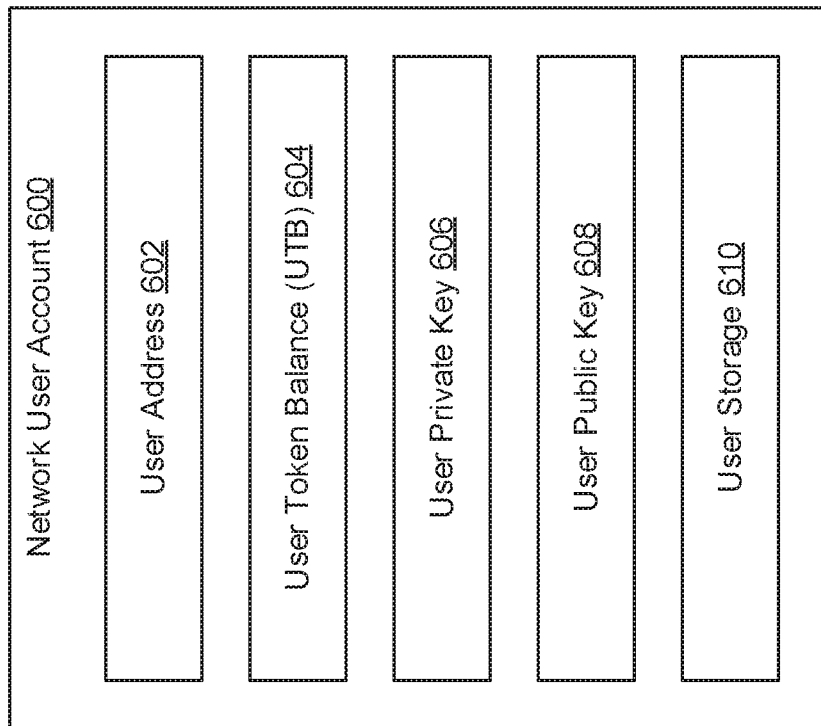
FIG. 6A shows a network user account in accordance with one or more embodiments of the invention.

FIG. 6A shows a network user account in accordance with one or more embodiments of the invention. A network user account (600) may refer to an account type particularly associated with a blockchain network user—i.e., an operator of a blockchain node. Further, a network user account (600) may entail information distinct to a blockchain network user, which may enable the blockchain network user to authenticate to the blockchain network. Specifically, in one embodiment of the invention, a network user account (600) may include, but is not limited to: a user address (602), a user token balance (UTB) (604), a user private key (606), a user public key (608), and user storage (610). Each of these components is described below.

In one embodiment of the invention, the user address (602) may refer to a unique identifier directed to the network user account (600) and associated with a corresponding blockchain network user. Further, in one embodiment of the invention, the UTB (604) may refer to a digital wallet that tracks the total quantity of tokens (i.e., digital currency for the blockchain network) owned by the blockchain network user associated with the network user account (600).

In one embodiment of the invention, the user private key (606) and the user public key (608) may be asymmetric encryption keys used in the authentication of transactions signed by the blockchain network user associated with the network user account (600). To sign a transaction, the blockchain network user may use the user private key (606) to encrypt the transaction. Thereafter, the encrypted or signed transaction may subsequently be broadcasted across the blockchain network, where it may be received by one or more other blockchain nodes—e.g., blockchain block generators (BBGs) (see e.g., FIG. 2C). In receiving the signed transaction, another blockchain network user operating, for example, a BBG, may authenticate the signed transaction using the user public key (608), which may have been published or distributed across the blockchain network prior to or during broadcasting of the signed transaction.

In one embodiment of the invention, the user storage (610) may refer to a logical storage partition allocated to the blockchain network user associated with the network user account (600). The logical storage partition may be implemented across one or more physical storage units and/or devices that reside on one or more blockchain nodes. Further, the user storage (610) may consolidate any information pertinent to the blockchain network user. For example, the user storage (610) may consolidate one or more roles associated with the blockchain network user, which may indicate whether the blockchain network user is a resource requestor, a resource provider, a block generator, an data feed service, or any combination thereof.

FIG. 6B shows a smart contract account in accordance with one or more embodiments of the invention. A smart contract account (620) may refer to an account type particularly associated with a smart contract—i.e., a computer program stored on the blockchain. Further, a smart contract account (6020) may entail information distinct to a smart contract, which may enable the smart contract to interact with the blockchain network. Specifically, in one embodiment of the invention, a smart contract account (620) may include, but is not limited to: a contract address (622), a contract token balance (CTB) (624), contract state (626), contract byte-code (CBC) (628), and contract storage (630). Each of these components is described below.

In one embodiment of the invention, the contract address (622) may refer to a unique identifier directed to the smart contract account (620) and associated with an already created smart contract stored in the blockchain. Further, in one embodiment of the invention, the CTB (624) may refer to a digital wallet that tracks the total quantity of tokens (i.e., digital currency for the blockchain network) owned or handled by the smart contract associated with the smart contract account (620). By way of an example, the CTB (624) may hold tokens, transferred to the smart contract by a resource requestor, as a retainer for the reserved resources that may be allocated to the resource requestor by the resource provider upon enforcement of the contractual terms specified in the smart contract.

In one embodiment of the invention, contract state (626) may refer to the current state of all fields and variables declared in the smart contract. Said another way, the contract state (626) may refer to the data pertinent to the smart contract associated with the smart contract account (620). On the other hand, CBC (628) may represent compiled computer readable program code, which pertains to the smart contract associated with the smart contract account (620). The CBC (628) may also refer to byte-code that the blockchain virtual machine (BVM), residing on each blockchain node, can interpret and subsequently execute in order to create the smart contract or call upon one or more subroutines/functions of the smart contract.

In one embodiment of the invention, the contract storage (630) may refer to a logical storage partition allocated to the smart contract associated with the smart contract account (620). The logical storage partition may be implemented across one or more physical storage units and/or devices that reside on one or more blockchain nodes. Further, the contract storage (630) may consolidate any information pertinent to the smart contract. For example, the contract storage (630) may consolidate the contract state (626).

Figure 7:
FIG. 7 shows a smart contract in accordance with one or more embodiments of the invention.

FIG. 7 shows a smart contract in accordance with one or more embodiments of the invention. A smart contract (700) may be a computer program that specifies and enforces contractual terms, negotiated between blockchain network users (e.g., a resource requestor and a resource provider), for the exchange of resources, services, and/or recompense. Similar to a class in various programming languages, a smart contract (700) may include, but is not limited to: a contract name (702), one or more contract variables (704), one or more contract functions (706), and zero or more contract events (708). Each of these components is described below.

In one embodiment of the invention, the contract name (702) may be an alphanumeric character string that refers to an identifying designation for the smart contract (700). A contract variable (704) may refer to a static or dynamic value that may be manipulated, or otherwise used, by one or more subroutines specified in the smart contract (700). Contract variables (704) may also be referred herein as contract state. Further, a contract function (706) may refer to a sequence of computer instructions, expressed as computer readable program code, which when executed, may perform tasks pertinent to declaring and enforcing the contractual terms negotiated between blockchain node users specified in the smart contract (700). A contract function (706) may, for example, enable the smart contract (700) to interact with other smart contracts, make decisions, store information, and transfer tokens to one or more network user accounts or other smart contract accounts.

In one embodiment of the invention, a contract event (708) may refer to a special subroutine that triggers a response from an entity operating external to the blockchain—e.g., the data feed service (DFS) blockchain node (see e.g., FIG. 2C). Specifically, when the smart contract (700) calls upon or emits a contract event (708), external entities such as the DFS listen for these events, which can also pass one or more arguments. The external entities, subsequently, based on the detecting of a contract event (708) and using any passed arguments, may perform tasks that the smart contract (700) itself cannot natively execute because of its isolated nature within the blockchain. By way of an example, contract events (708) may enable a smart contract (700) to attain reserved resources allocation information from a reserved resources provider (RRP) (see e.g., FIG. 2A), via an DFS. Reserved resources allocation information may pertain to information pertinent to the allocation of one or more cloud environment resources from a resource provider to a resource requestor/consumer. For example, reserved resources allocation information may specify: (a) a resource requestor address (described above); (b) a resource provider address (described above); and (c) measurable quantities of one or more reserved resource types (e.g., compute resources, storage resources, network resources, and/or virtualization resources), which have been allocated to resource requestor by the resource provider. Further, a smart contract (700) may use reserved resources allocation information to enforce contractual terms, specified in the smart contract (700), which have been negotiated between the resource requestor and the resource provider.

Figure 8A:
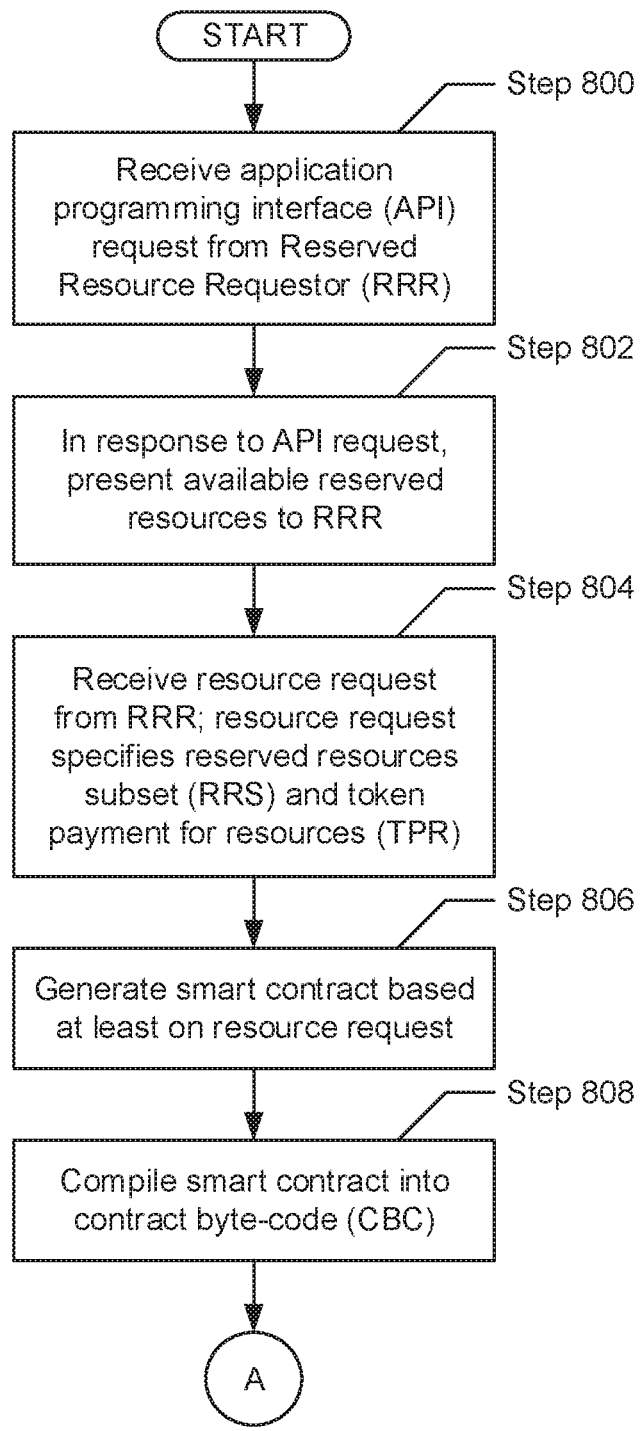
FIGS. 8A-8C show flowcharts describing a method for embedding a smart contract into a blockchain in accordance with one or more embodiments of the invention.
Figure 8B:
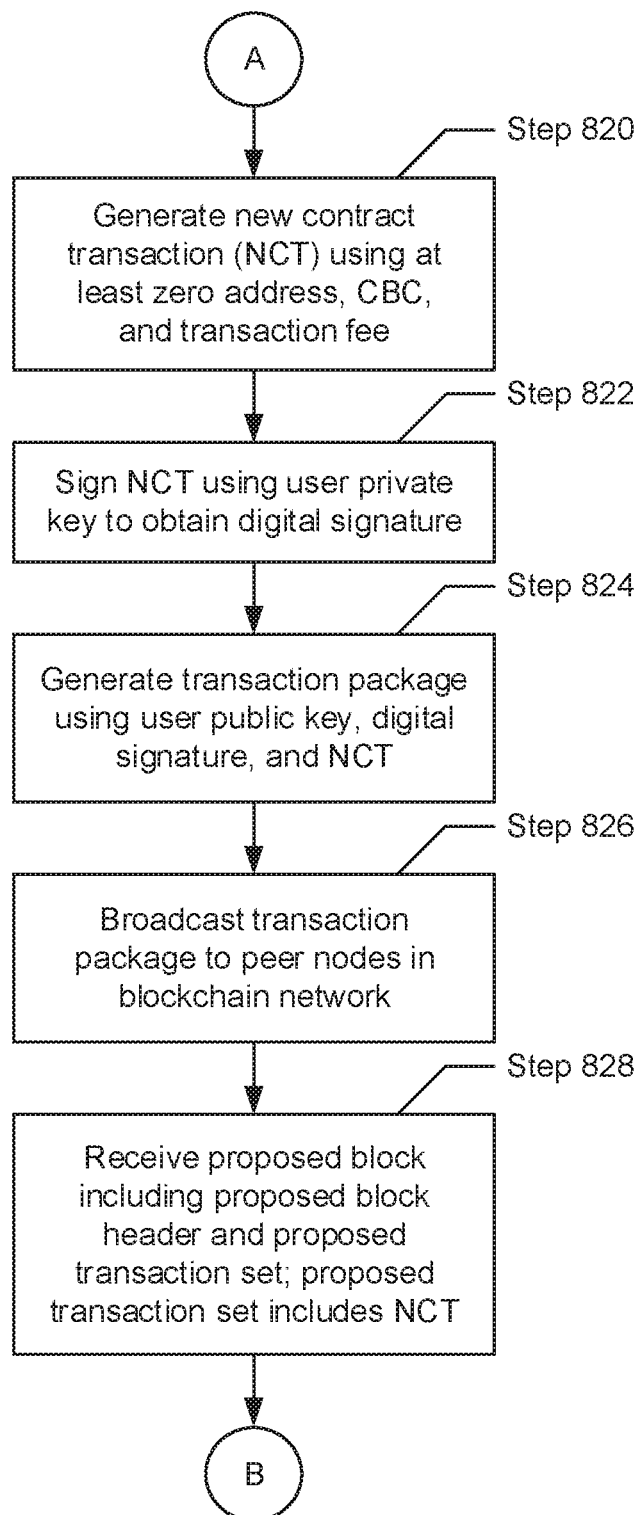
Figure 8C:
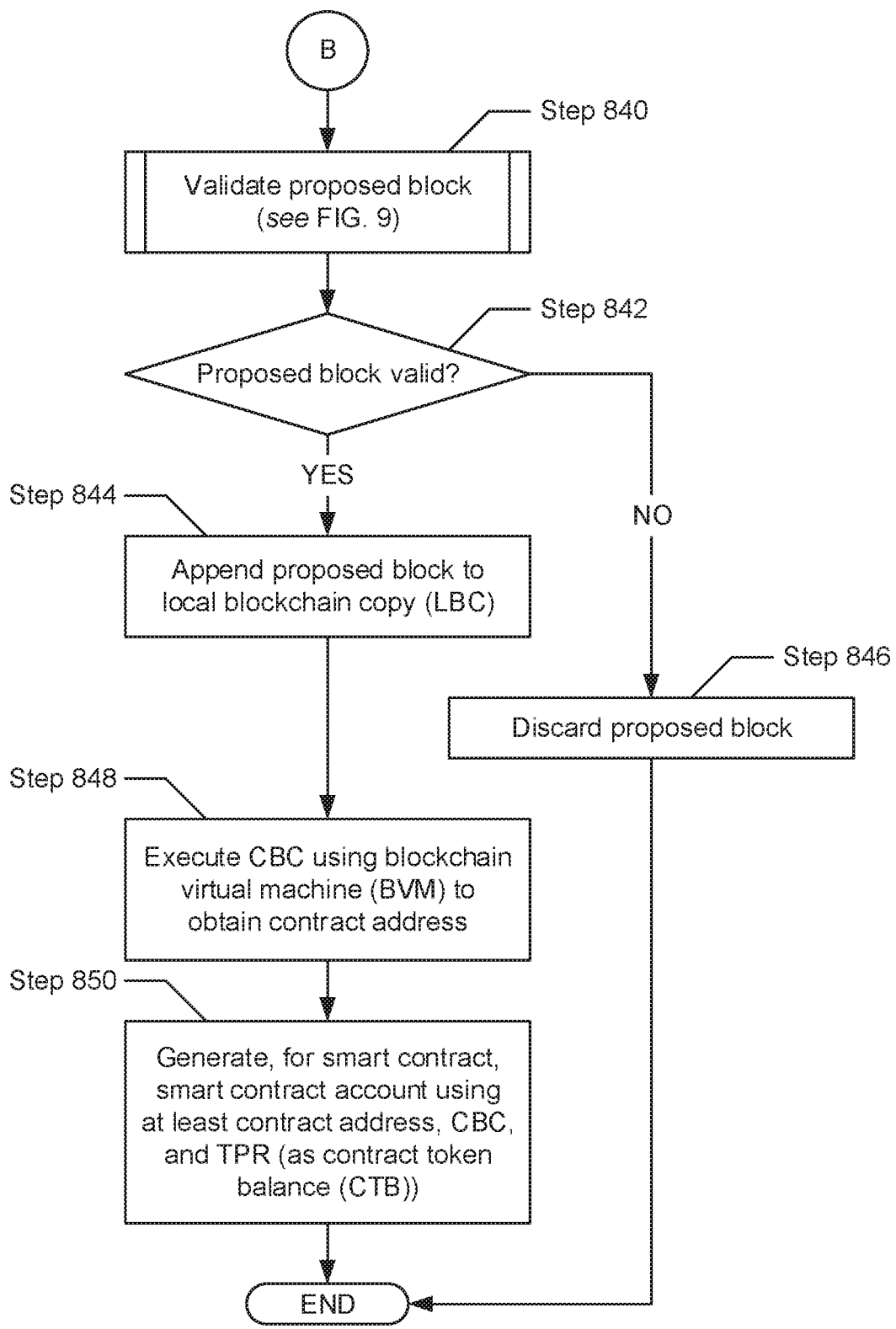

FIGS. 8A-8C show flowcharts describing a method for embedding a smart contract into a blockchain in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 8A-8C may be performed in parallel with any other steps shown in FIGS. 9-12C without departing from the scope of the invention.

Turning to FIG. 8A, in Step 800, an application programming interface (API) request is received from a reserved resource requestor (RRR). In one embodiment of the invention, a RRR may refer to a role fulfilled by a blockchain network user and/or an associated blockchain node that may be seeking to procure cloud environment resources for various purposes. Further, the API request may enable the RRR to contact and interact with a reserved resource provider (RRP). A RRP may refer to another role fulfilled by a blockchain network user and/or an associated blockchain node that may offer cloud environment resources in exchange for recompense.

In Step 802, in response to the API request (received in Step 800), available reserved resources are presented to the RRR. In one embodiment of the invention, presentation of the available reserved resources may entail providing information to the RRR through, for example, a user interface with which the RRR may interact. The provided information may encompass the identification of one or more reserved resource types—e.g., reserved compute resources, reserved storage resources, reserved network resources, and/or reserved virtualization resources—that may be available for procurement. The provided information may further encompass available measurable quantities for each reserved resource type that may be offered by a RRP, along with cost information per base unit of the reserved resource type.

In Step 804, after perusing through the provided available reserved resources information (presented in Step 802), a resource request is received from the RRR. In one embodiment of the invention, the resource request may specify a reserved resources subset (RRS) and a token payment for resources (TPR). The RRS may refer to some measurable quantity (or subset) of a total quantity available for each reserved resource type that the RRR may be seeking to procure. For example, the RRS may specify that the RRR wishes to procure: twenty (20) central processing unit (CPU) cores, five-hundred (500) terabytes of persistent storage, and four (4) gigabits per second (Gbps) of network bandwidth—each of which may represent a subset of the total available reserved resources for a respective reserved resource type that may be offered by the RRP. Furthermore, the TPR may be a numerical value that refers to a negotiated amount of tokens (or recompense) to be paid for the RRS specified in the resource request. For the exemplified RRS mentioned earlier, the TPR may specify a total cost or payment amount (in digital currency—i.e., tokens), which must be paid by the RRR, in order to procure the RRS.

In Step 806, a smart contract is generated based at least one the resource request (received in Step 804). As described above, in one embodiment of the invention, a smart contract may be a computer program that recites and enforces contractual terms, agreed between the RRR and the RRP, regarding the exchange of resources and/or services for recompense. Subsequently, the smart contract may specify: (a) a contract name associated with the smart contract; (b) one or more contract variables (i.e., static and/or dynamic values) that track state relevant to the contractual terms; (c) one or more contract functions, or subroutines, that permit the smart contract to change state and perform tasks relevant to enforcing the contractual terms; and/or (d) one or more contract events, which may enable the smart contract to query information (e.g., reserved resource allocation information (described above)) not normally accessible to the smart contract. The queried information may be obtained by an data feed service (DFS) (see e.g., FIG. 2C) at the behest of the smart contract from an external data source, which the smart contract may use to further enforce the contractual terms. Further, in one embodiment of the invention, a contractual term may refer to a provision that forms, at least in part, the agreement between the RRR and the RRP. In reference to the smart contract, a contractual term may be expressed as conditional statements—e.g., if-then statements or if-then-else statements. By way of an example, a contractual term specified in a smart contract, represented in pseudo program code, may recite: IF (RRR provides TPR to RRP) THEN (allocate RRS from RRP to RRR).

In Step 808, the smart contract (generated in Step 806) is compiled to obtain contract byte-code (CBC). In one embodiment of the invention, compilation of the smart contract may entail converting the smart contract, which may be expressed in a high-level programming language, into machine-readable or low-level program code. Further, the CBC that which the smart contract becomes may pertain to byte-code that can be processed or executed by a blockchain virtual machine (BVM) that runs on all blockchain nodes of a blockchain network. The BVM refers to a runtime environment for the execution of smart contracts.

Turning to FIG. 8B, in Step 820, a new contract transaction (NCT) (see e.g., FIG. 5B) is generated. In one embodiment of the invention, the NCT may refer to a transaction type that serves to commit a smart contract (i.e., the smart contract generated in Step 806) to the blockchain replicated throughout the blockchain network. Specifically, the NCT may be a data object or structure that may specify at least a zero address, the CBC (obtained in Step 808), and a transaction fee. As described above, the zero address may refer to a unique identifier, often expressed as an empty character string, which triggers the creation and/or commitment of a smart contract. The transaction fee, on the other hand, may refer to a reward, expressed in tokens, which incentivizes other blockchain nodes on the blockchain network to validate the NCT, thereby committing the NCT, along with the smart contract (represented through the CBC enclosed therin), into the blockchain.

In Step 822, the NCT (generated in Step 820) is signed. In one embodiment of the invention, signing of the NCT may entail cryptographically encrypting the NCT using a user private key (described above), associated with the RRP, to obtain a digital signature. The digital signature may refer to an encrypted hash of the NCT. In Step 824, a transaction package is generated using at least the digital signature (obtained in Step 822) and the NCT (generated in Step 820). Further, in one embodiment of the invention, the transaction package may further be generated using a user public key (described above) associated with the RRP. In another embodiment of the invention, the user public key may have been published to the blockchain network some time prior to the triggering of the method disclosed through FIGS. 8A-8C. Moreover, the transaction package may refer to a data object or structure that may encode the NCT, the digital signature, and, optionally, the user public key, to a more transmission-facilitating format.

In Step 826, the transaction package (generated in Step 824) is broadcasted to one or more peer nodes in the blockchain network. In one embodiment of the invention, a peer node may refer to a blockchain node (of a subset of blockchain nodes in the blockchain network) with which the RRP (whom may be performing the various steps of FIGS. 8A-8C) directly communicates. Further, a peer node may refer to any blockchain node within a specified next-hop cost away from the RRP in a blockchain network topology. Each peer node subsequently propagates the broadcast to their respective peer nodes, and so on, until all blockchain nodes in the blockchain network receive the transaction package (generated in Step 824).

In Step 828, a proposed block is received. In one embodiment of the invention, a proposed block may refer to an uncommitted blockchain block, which may have been broadcasted by a blockchain block generator (BBG) (see e.g., FIG. 2C). The proposed block may include at least a proposed block header and a proposed transaction set (see e.g., FIG. 3). The proposed block header may specify metadata pertinent to the proposed block, whereas the proposed transaction set may refer to a data object or structure that specifies one or more unconfirmed (or uncommitted) transactions. Further, the proposed transaction set may include at least the NCT (enclosed in the transaction package broadcasted in Step 826).

Turning to FIG. 8C, in Step 840, the proposed block (received in Step 828) is validated. Details of the block validation process are further described below with respect to FIG. 9. In brief, however, the block validation process may entail verifying a claim, by a BBG, to an aggregation of rewards (including the NCT transaction fee) for purportedly validating the one or more transactions (including the NCT) specified in the proposed transaction set of the proposed block. Validation of the proposed transaction set, by a BBG, may entail employment of a consensus algorithm By way of an example, FIG. 9 outlines various steps for validating the proposed block based on a validation of the proposed transaction set using the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

In Step 842, based on an outcome of the block validation process (performed in Step 840), a determination is made as to whether the proposed block is valid. In one embodiment of the invention, the proposed block may be valid when the purported validation of the proposed transaction set has been verified, whereas the proposed block may be invalid when the purported validation of the proposed transaction set has been unfounded. Accordingly, if it is determined that the proposed block is valid, then the process may proceed to Step 844. On the other hand, if it is alternatively determined that the proposed block is invalid, then the process may alternatively proceed to Step 846.

In Step 844, after determining (in Step 842) that the proposed block (received in Step 828) is valid, the proposed block is appended or committed to a local blockchain copy (LBC). The LBC may refer to a locally stored copy of the blockchain. Upon committing to the LBC, each transaction (including the NCT generated in Step 820) in the proposed transaction set of the proposed block may be executed by the BVM (described above).

In Step 848, in executing the NCT, the CBC enclosed therein may be executed, by the BVM, to update the state of the blockchain (e.g., the LBC) to instantiate the smart contract. Further, in one embodiment of the invention, execution of the CBC may also trigger the generation of a contract address for the smart contract (generated in Step 806). The contract address may refer to a unique identifier directed to the smart contract account and assigned to the smart contract. Moreover, generation of the contract address may entail: (a) obtaining a resource provider address, associated with the RRP, from the NCT (see e.g., FIG. 5B); (b) obtaining a nonce value specified in the proposed block header (see e.g., FIG. 3); and (c) applying a hashing function to the resource provider address and nonce value to obtain a hash digest, where at least a portion of the resulting hash digest may be identified as the contract address.

In Step 850, a smart contract account (see e.g., FIG. 6B), for the smart contract (generated in Step 806), is generated. In one embodiment of the invention, the smart contract account may refer to an account type particularly associated with the smart contract, which enables the smart account to participate in the blockchain network through the issuing of transactions. Furthermore, the smart contract account may be generated using at least the contract address (generated/obtained in Step 848), the CBC (into which the smart contract had been compiled in Step 808), and the TPR (specified in the resource request received in Step 804).

In Step 846, after determining (in Step 842) that the proposed block (received in Step 828) is invalid, the proposed block is discarded.

Figure 9:
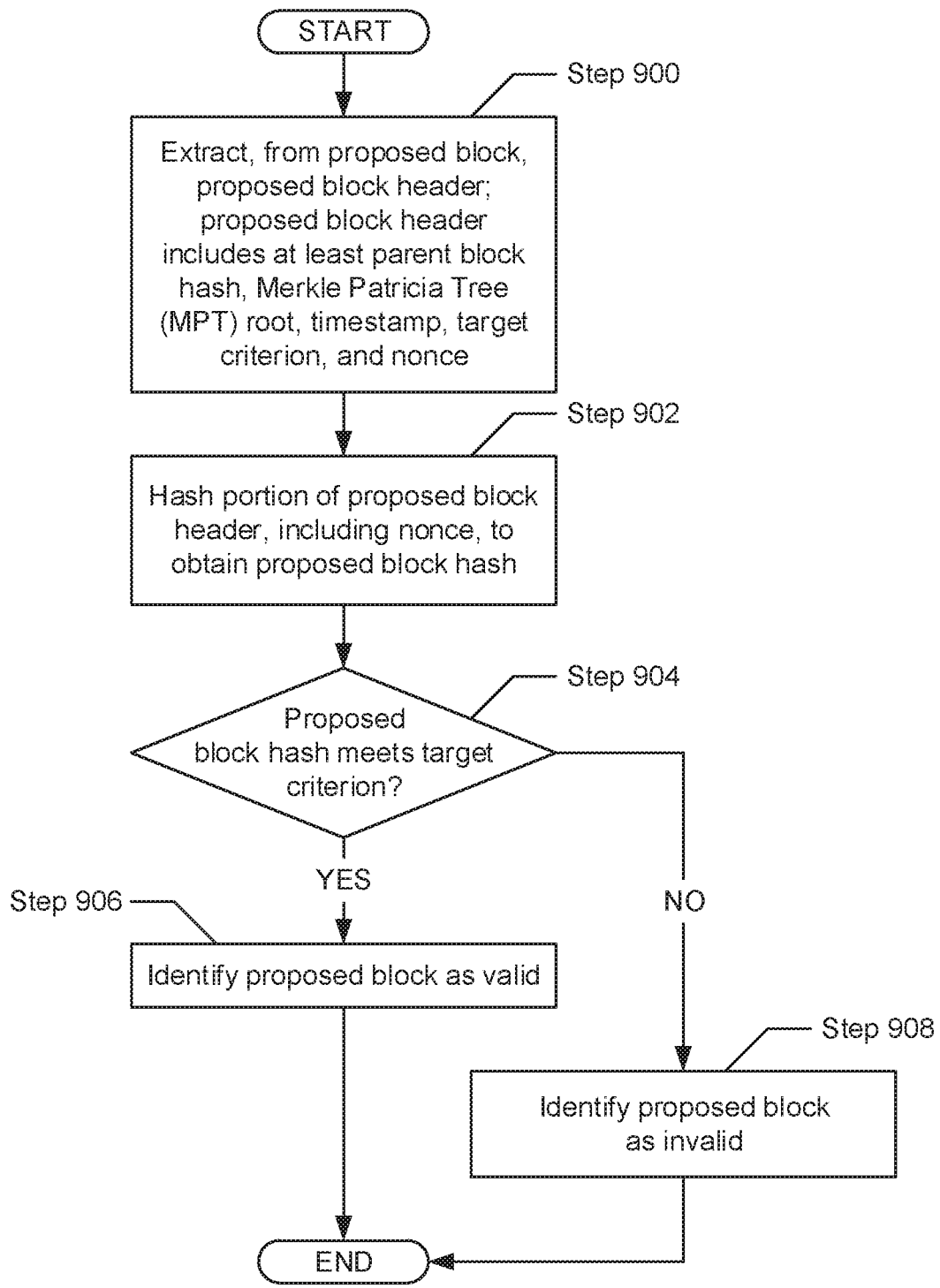
FIG. 9 shows a flowchart describing a method for validating a proposed block in accordance with one or more embodiments of the invention.

FIG. 9 shows a flowchart describing a method for validating a proposed block in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 9 may be performed in parallel with any other steps shown in FIGS. 8A-8C and 10A-12C without departing from the scope of the invention.

FIG. 9, by way of an example, outlines various steps for validating a proposed block based on a validation of a proposed transaction set (found in the proposed block and performed by a blockchain block generator (BBG) (see e.g., FIG. 2C) using the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

Turning to FIG. 9, in Step 900, from within a proposed block, a proposed block header is extracted. In one embodiment of the invention, the proposed block header may specify various metadata pertaining to the proposed block and the proposed transaction set also enclosed therein. More specifically, the various metadata specified in the proposed block header may include, but is not limited to: a parent block hash, a Merkle-Patricia tree (MPT) root, a timestamp, a target criterion, and a nonce value. Details defining each of these aforementioned items are disclosed above with respect to FIGS. 3 and 4.

In Step 902, at least a portion of the proposed block header (extracted in Step 900) is fed through a hashing function to obtain a proposed block hash. In one embodiment of the invention, the portion of the proposed block header that may be used in the generation of the proposed block hash must include the nonce value. That is, the proposed block hash may be generated from one or more metadata specified in the proposed block header (including at least the nonce value).

In Step 904, a determination is made as to whether the proposed block hash (obtained in Step 902) meets the target criterion. In one embodiment of the invention, the target criterion may be a condition or threshold that defines a validity of the proposed block. Accordingly, if it is determined that the proposed block hash satisfies the target criterion for the proposed block, then the process may proceed to Step 906. On the other hand, if it is determined that the proposed block hash fails to satisfy the target criterion for the proposed block, then the process may proceed to Step 908.

In Step 906, after determining (in Step 904) that the proposed block hash (obtained in Step 902) satisfies the target criterion for the proposed block, the proposed block is identified as being valid. Alternatively, in Step 908, after determining (in Step 904) that the proposed block hash fails to satisfy the target criterion for the proposed block, the proposed block is identified as being invalid.

Figure 10A:
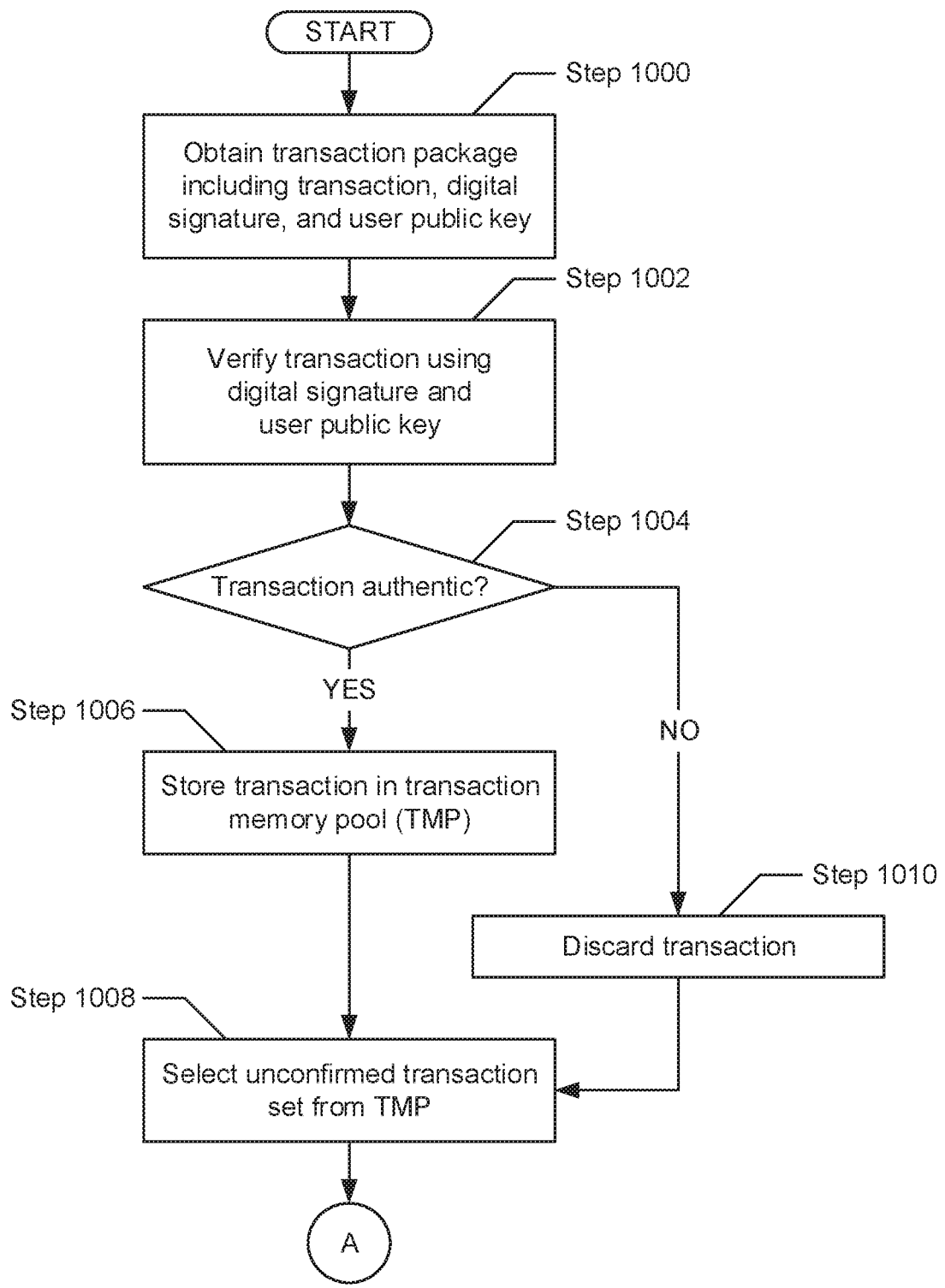
FIGS. 10A-10C show flowcharts describing a method for generating a proposed block in accordance with one or more embodiments of the invention.
Figure 10B:
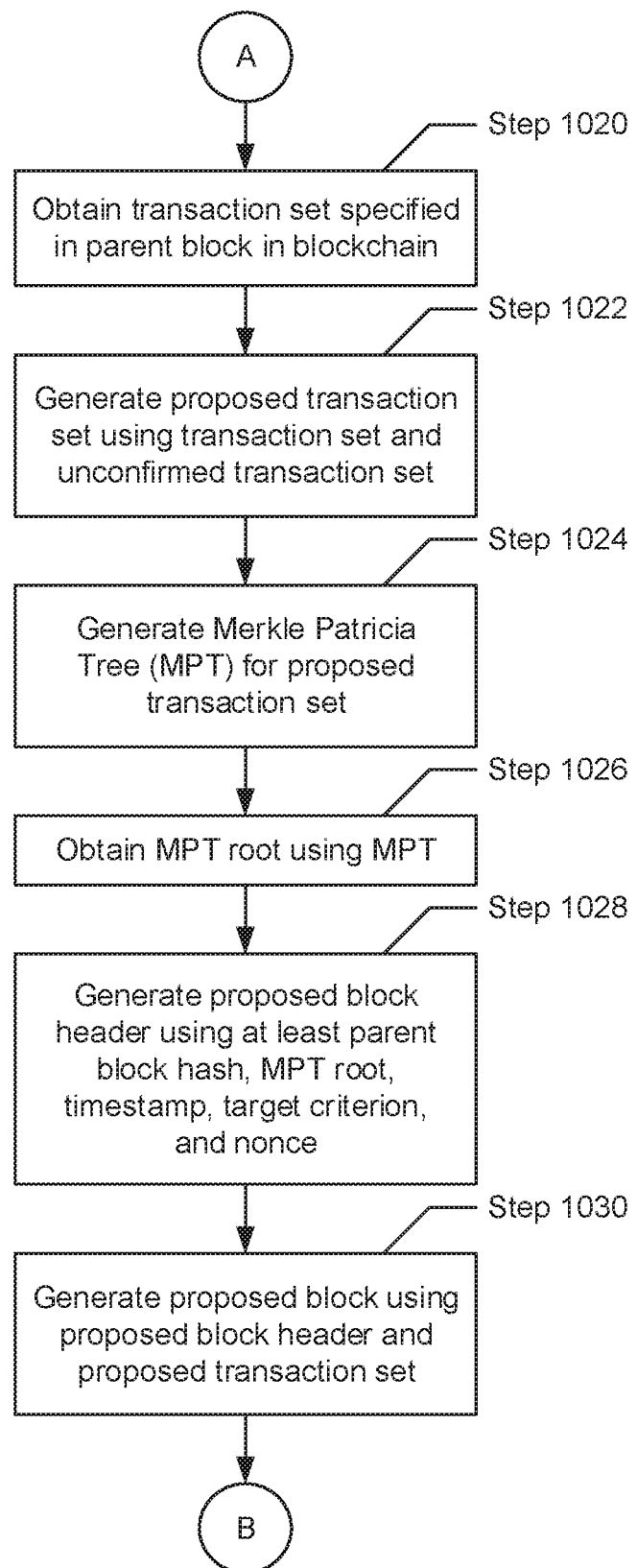
Figure 10C:
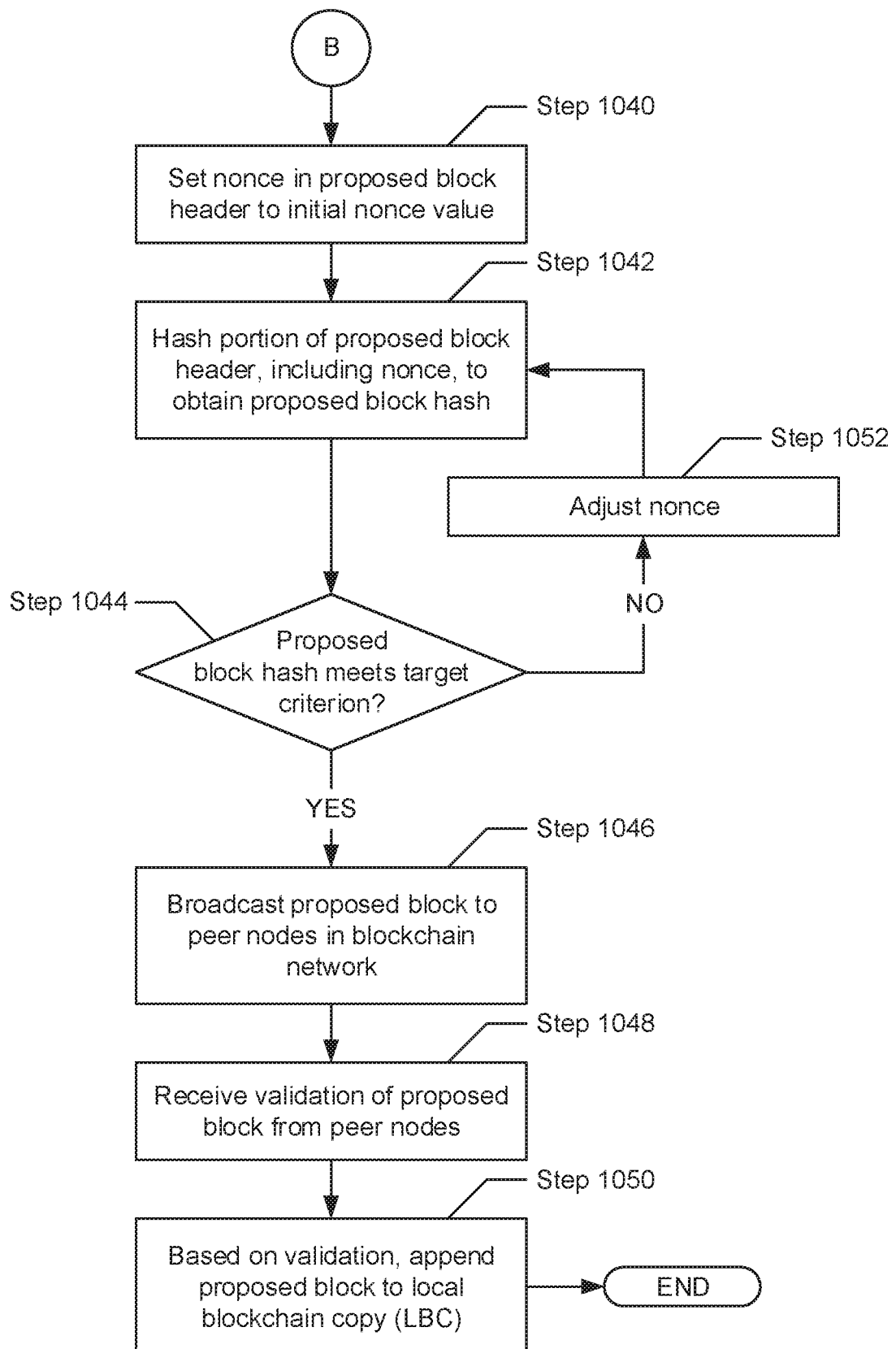

FIGS. 10A-10C show flowcharts describing a method for generating a proposed block in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 10A-10C may be performed in parallel with any other steps shown in FIGS. 8A-9 and 11A-12C without departing from the scope of the invention.

Turning to FIG. 10A, in Step 1000, a transaction package is obtained. In one embodiment of the invention, the transaction package may be obtained after being broadcasted, by another blockchain node, across the blockchain network. Further, the transaction package may at least include a transaction and a digital signature. In one embodiment of the invention, the transaction package may further include a user public key associated with a generator or sender of the transaction package. In another embodiment of the invention, the user public key may have been published across the blockchain network, by the aforementioned transaction package generator/sender, some time prior to the triggering of the method portrayed in FIGS. 10A-10C. Moreover, the enclosed transaction may pertain to a token transfer transaction (TTT) (see e.g., FIG. 5A), a new contract transaction (NCT) (see e.g., FIG. 5B), or a contract execution transaction (CET) (see e.g., FIG. 5C). The digital signature may embody an encrypted hash of the transaction, which may have been generated using a user private key associated with the transaction package generator/sender. The user private and public keys may be asymmetric encryption keys used to implement transaction authentication.

In Step 1002, the transaction (obtained in Step 1000) is verified. Specifically, in one embodiment of the invention, the transaction may be verified using the digital signature and the user public key (also obtain in or prior to Step 1000). More specifically, verification of the transaction may entail employing public key or asymmetrical cryptography, which uses the user public key to decrypt the digital signature, thereby obtaining a first hash digest. Hereafter, in one embodiment of the invention, the transaction may be fed through a hashing function—i.e., the same hashing function used, at least in part, to generate the digital signature—thereby obtaining a second hash digest.

In Step 1004, a determination is made as to whether the transaction (verified in Step 1002) is authentic. In one embodiment of the invention, the transaction may be authentic when the first hash digest matches the second hash digest. Conversely, the transaction may not be authentic when the first hash digest mismatches the second hash digest. Accordingly, if it is determined that the transaction is authentic, then the process may proceed to Step 1006. On the other hand, if it is alternatively determined that the transaction is not authentic, then the process may alternatively proceed to Step 1010.

In Step 1006, after determining (in Step 1004) that the transaction (obtained in Step 1000) is authentic, the transaction is stored in a transaction memory pool (TMP). In one embodiment of the invention, the TMP may refer to a storage buffer that consolidates authenticated, yet unconfirmed transactions (including any metadata specified in the transactions such as, for example, the transaction fee). Alternatively, in Step 1010, after determining (in Step 1004) that the transaction (obtained in Step 1000) is not authentic, the transaction is discarded.

In Step 1008, following the storage of the transaction (in Step 1006) or the discarding of the transaction (in Step 1010), an unconfirmed transaction set is selected from the TMP. In one embodiment of the invention, an unconfirmed transaction set may encompass a set of one or more unconfirmed transactions. An unconfirmed transaction may refer to a transaction that has yet to be committed into the blockchain. Further, selection of the one or more unconfirmed transactions, from the TMP, to constitute the unconfirmed transaction set may be based, at least in part, on the transaction fee associated with each unconfirmed transaction. Particularly, unconfirmed transactions associated with higher transaction fees, representative of higher rewards, may be selected over unconfirmed transactions associated with lower transaction fees.

Turning to FIG. 10B, in Step 1020, a transaction set is obtained. In one embodiment of the invention, the transaction set may refer to a set of one or more confirmed transactions specified in a parent block in the blockchain. The parent block may pertain to a latest confirmed or committed block of the blockchain. Further, a confirmed transaction may refer to a transaction that has been committed to the blockchain through a committing of a block to the blockchain in which the transaction is enclosed.

In Step 1022, a proposed transaction set is generated. Specifically, in one embodiment of the invention, the proposed transaction set may be generated using the transaction set (obtained in Step 1020) and the unconfirmed transaction set (selected in Step 1008). Perceived in a different way, the proposed transaction set may be a superset consisting of the transaction set concatenated with the unconfirmed transaction set.

In Step 1024, a Merkle-Patricia tree (MPT) is generated for the proposed transaction set (generated in Step 1022). In one embodiment of the invention, a MPT may refer to a binary hash tree that serves as an efficient and secure mechanism for verifying (or otherwise authenticating) the contents of the proposed transaction set. Details pertaining to the architecture of a MPT is further described above with respect to FIG. 4. Following generation of the MPT, in Step 1026, the MPT root of the MPT is obtained. In one embodiment of the invention, the MPT root may refer to a topmost node in the MPT, which may be representative of the aggregated cryptographic hash for all transactions specified in the proposed transaction set (generated in Step 1022).

In Step 1028, a proposed block header is generated. In one embodiment of the invention, the proposed block header may refer to a data object or structure that specifies various metadata pertaining to a proposed block and/or the proposed transaction set (generated in Step 1022). Furthermore, the proposed block header may be generated using at least a parent block hash, the MPT root (obtained in Step 1026), a timestamp, a target criterion, and a nonce value. Details pertaining to each of these items are further described above with respect to FIG. 3.

In Step 1030, a proposed block is generated. In one embodiment of the invention, the proposed block may refer to a data object or structure that specifies a proposed block header and a proposed transaction set. Accordingly, the proposed block may be generated using the proposed block header (generated in Step 1028) and the proposed transaction set (generated in Step 1022). Furthermore, the proposed block may be a potential next block that may or may not be committed into the blockchain based on a block validation process (see e.g., FIG. 9).

Turning to FIG. 10C, in Step 1040, the nonce (see e.g., FIG. 3) specified in the proposed block header (generated in Step 1028) is set to an initial nonce value. In one embodiment of the invention, this initial nonce value may be a numerical value of zero. In another embodiment of the invention, the initial nonce value may be any arbitrary numerical value selected by a blockchain block generator (BBG) (see e.g., FIG. 2C)—i.e., a blockchain node and/or an operator of the blockchain node.

In Step 1042, at least a portion of the proposed block header (generated in Step 1028) is fed through a hashing function to obtain a proposed block hash. In one embodiment of the invention, the portion of the proposed block header that may be used in the generation of the proposed block hash must include the nonce value. That is, the proposed block hash may be generated from one or more metadata specified in the proposed block header (including at least the nonce value).

In Step 1044, a determination is made as to whether the proposed block hash (obtained in Step 1042) meets the target criterion for the proposed block, which may be specified in the proposed block header (generated in Step 1028). In one embodiment of the invention, the target criterion may be a condition or threshold that defines a validity of the proposed block. Accordingly, if it is determined that the proposed block hash satisfies the target criterion for the proposed block, then the process may proceed to Step 1046. On the other hand, if it is determined that the proposed block hash fails to satisfy the target criterion for the proposed block, then the process may proceed to Step 1052.

In Step 1046, after determining (in Step 1044) that the proposed block hash (obtained in Step 1042) satisfies the target criterion for the proposed block, the proposed block (generated in Step 1030) is broadcasted to one or more peer nodes in the blockchain network. In one embodiment of the invention, a peer node may refer to a blockchain node (of a subset of blockchain nodes in the blockchain network) with which the BBG (whom may be performing the various steps of FIGS. 10A-10C) directly communicates. Further, a peer node may refer to any blockchain node within a specified next-hop cost away from the BBG in a blockchain network topology. Each peer node subsequently propagates the broadcast to their respective peer nodes, and so on, until all blockchain nodes in the blockchain network receive the proposed block.

In Step 1048, following the broadcast of the proposed block (in Step 1046), a validation of the proposed block from one or more peer nodes is received. In one embodiment of the invention, the validation(s) may take form as a message indicating that they, through a block validation process (see e.g., FIG. 9), have determined that the proposed block (broadcasted in Step 1046) is valid. In Step 1050, based on the validation(s) (received in Step 1050), the proposed block (generated in Step 1030) is appended or committed to a local blockchain copy (LBC). Subsequently, in one embodiment of the invention, the proposed block becomes the latest confirmed or committed block of the blockchain.

In Step 1052, after determining (in Step 1044) that the proposed block hash (obtained in Step 1042) does not satisfy the target criterion for the proposed block, the nonce value directed to the nonce, specified in the proposed block header of the proposed block, is adjusted. In one embodiment of the invention, the nonce value may be incremented by a preset value (e.g., one) to adjust the nonce. In another embodiment of the invention, the nonce value may be set to another arbitrary value that may be selected by the BBG. After adjusting the nonce value, the process may proceed to Step 1042, where a different proposed block hash may be obtained, which may or may not satisfy the target criterion for the proposed block.

In one embodiment of the invention, the block validation process performed above through Steps 1040 to 1044 and 1052, for the proposed block, may specifically pertain to the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

FIGS. 11A-11F show flowcharts describing a method for executing a smart contract in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 11A-11F may be performed in parallel with any other steps shown in FIGS. 8A-10C and 12A-12C without departing from the scope of the invention.

Figure 11A:
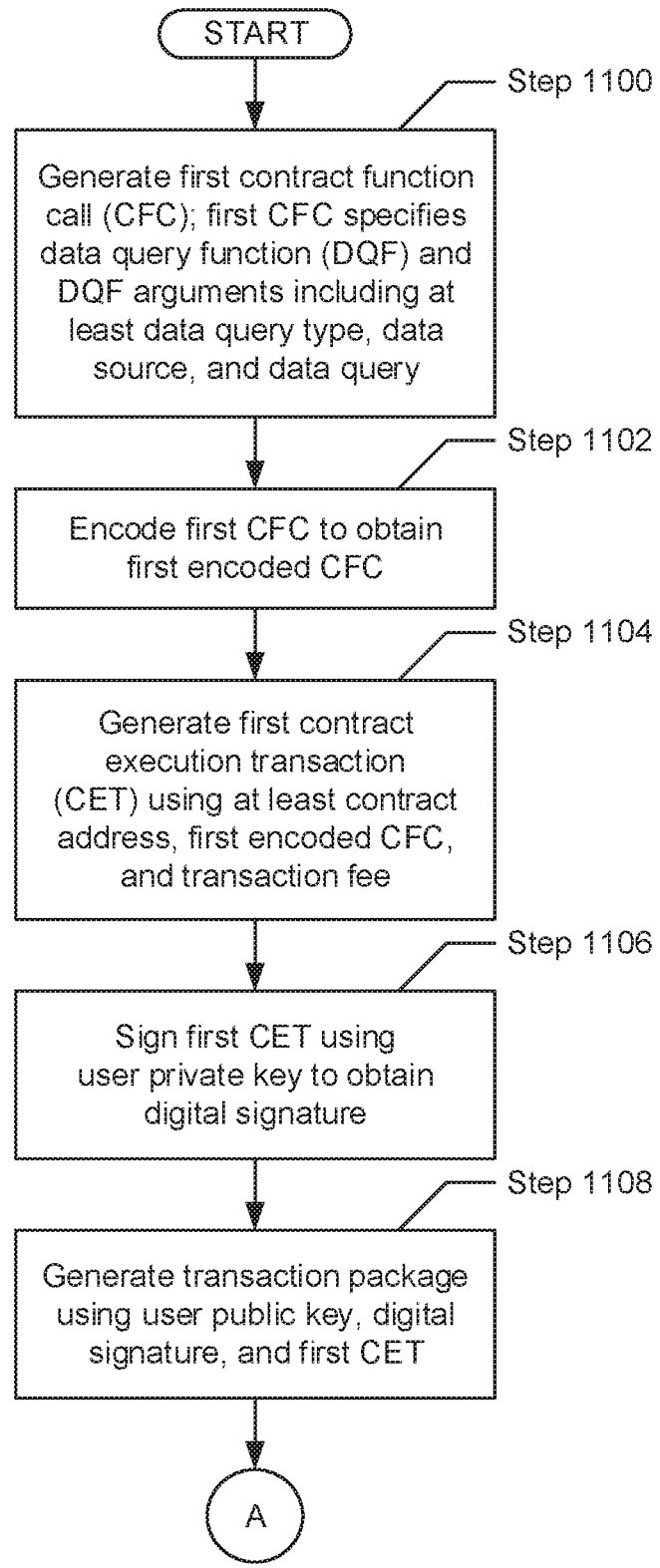
FIGS. 11A-11F show flowcharts describing a method for executing a smart contract in accordance with one or more embodiments of the invention.

Turning to FIG. 11A, in Step 1100, a first contract call function (CFC) is generated. Generally, in one embodiment of the invention, a CFC may be an expression that passes control, along with one or more arguments/parameters, to a subroutine of a smart contract. Particularly, the first CFC may specify an data query function (DQF) along with a set of DQF arguments. The DQF may refer to a smart contract event (see e.g., FIG. 7), which may be a special smart contract subroutine that triggers a response from an entity operating external to the blockchain—e.g., the data feed service (DFS) (see e.g., FIG. 2D). Further, the set of DQF arguments may at least include a data query type, a data source, and a data query.

In one embodiment of the invention, the data query type may reference a classification of the data query. By way of examples, the data query type may specify: (a) a uniform resource locator (URL) type, which pertains to a data query directed to any webpage or hypertext transfer protocol (HTTP) application programming interface (API) endpoint; (b) a WolframAlpha type, which pertains to a data query directed to the WolframAlpha computational engine; (c) a interplanetary file system (IPFS) type, which pertains to a data query directed to any content stored on an IPFS file; and (d) a random type, which pertains to a data query directed to any secure application providing random bytes generation.

In one embodiment of the invention, the data source may refer to a trusted provider of information. By way of an example, the data source may be a website or a web API accessible through an assigned web address—i.e., a URL. By way of another example, the data source may be a virtual machine executing on the cloud accessible through an Internet Protocol (IP) address. By way of yet another example, the data source may be another smart contract committed into the blockchain accessible through a contract address associated with the other smart contract. Furthermore, in one embodiment of the invention, the data query may reference the information being sought. Said another way, the data query may be an inquiry directed to the data source, which the data source may understand in order to provide the information being sought.

In Step 1102, the first CFC (generated in Step 1100) is encoded to obtain a first encoded CFC. In one embodiment of the invention, encoding the first CFC may entail converting the first CFC—i.e., an alphanumeric expression—to a hexadecimal character string.

In Step 1104, a first contract execution transaction (CET) (see e.g., FIG. 5C) is generated. In one embodiment of the invention, the first CET may refer to a transaction type that serves to call or execute a smart contract already committed to the blockchain. Specifically, the first CET may be a data object or structure that may specify at least a contract address, the first encoded CFC (obtained in Step 1102), and a transaction fee. In one embodiment of the invention, the contract address may refer to a unique identifier directed to a smart contract account, which may be associated with the smart contract being called/executed. Moreover, the transaction fee may refer to a reward, expressed in tokens, which incentivizes other blockchain nodes on the blockchain network to validate the first CET, thereby committing the first CET, along with the call to the DQF (i.e., a smart contract event), into the blockchain.

In Step 1106, the first CET (generated in Step 1104) is signed. In one embodiment of the invention, signing of the first CET may entail cryptographically encrypting the first CET using a user private key (described above), associated with a reserved resource provider (RRP) (see e.g., FIG. 2A), to obtain a digital signature. The digital signature may refer to an encrypted hash of the first CET. In Step 1108, a transaction package is generated using at least the digital signature (obtained in Step 1106) and the first CET (generated in Step 1104). Further, in one embodiment of the invention, the transaction package may further be generated using a user public key (described above) associated with the RRP. In another embodiment of the invention, the user public key may have been published to the blockchain network some time prior to the triggering of the method disclosed through FIGS. 11A-11F. Moreover, the transaction package may refer to a data object or structure that may encode the first CET, the digital signature, and, optionally, the user public key, to a more transmission-facilitating format.

Figure 11B:
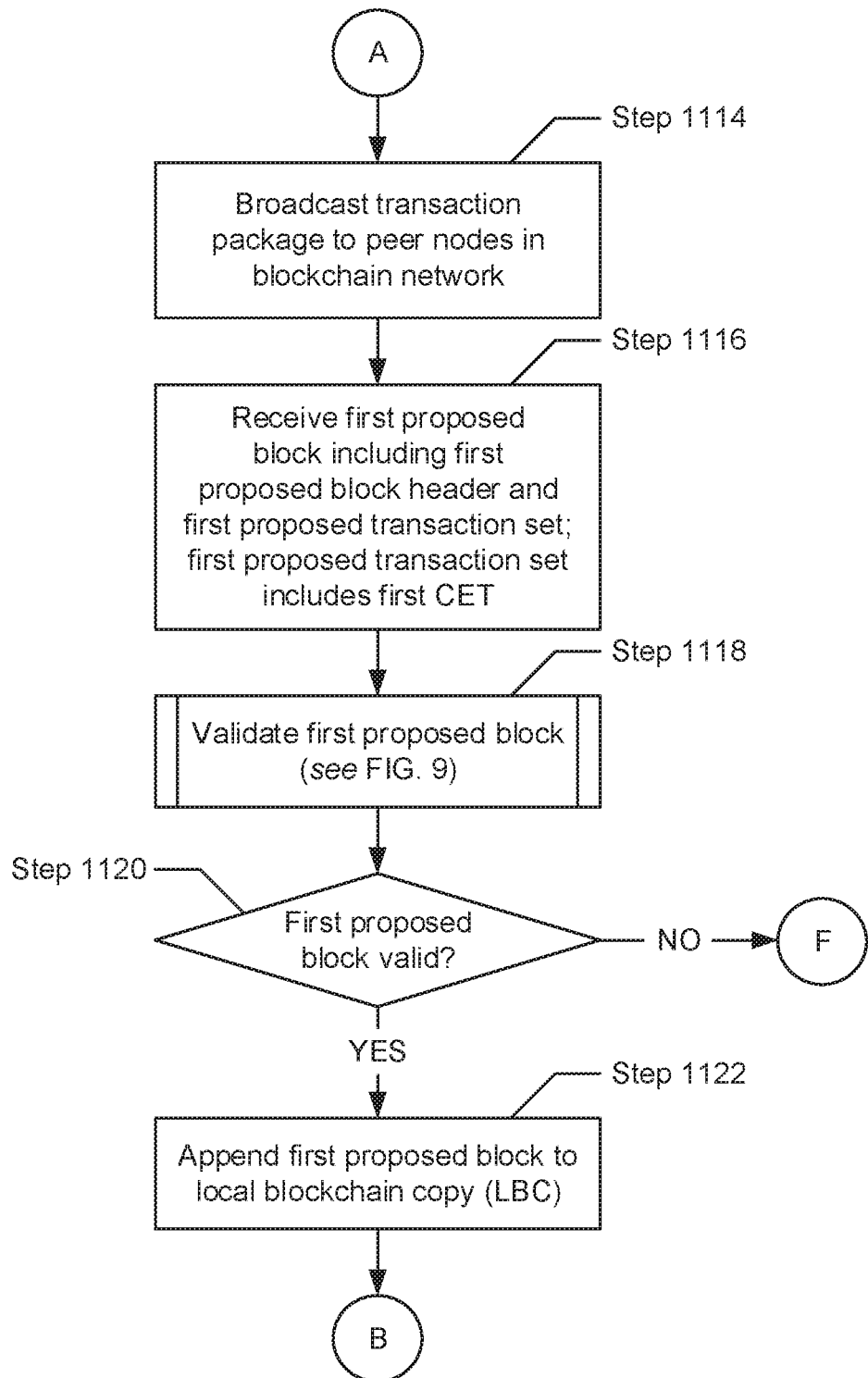

Turning to FIG. 11B, in Step 1114, the transaction package (generated in Step 1108) is broadcasted to one or more peer nodes in the blockchain network. In one embodiment of the invention, a peer node may refer to a blockchain node (of a subset of blockchain nodes in the blockchain network) with which the RRP (whom may be performing the various steps of FIGS. 11A-11F) directly communicates. Further, a peer node may refer to any blockchain node within a specified next-hop cost away from the RRP in a blockchain network topology. Each peer node subsequently propagates the broadcast to their respective peer nodes, and so on, until all blockchain nodes in the blockchain network receive the transaction package (generated in Step 1108).

In Step 1116, a first proposed block is received. In one embodiment of the invention, a proposed block may refer to an uncommitted blockchain block, which may have been broadcasted by a blockchain block generator (BBG) (see e.g., FIG. 2C). The first proposed block may include at least a first proposed block header and a first proposed transaction set (see e.g., FIG. 3). The first proposed block header may specify metadata pertinent to the first proposed block, whereas the first proposed transaction set may refer to a data object or structure that specifies one or more unconfirmed (or uncommitted) transactions. Further, the first proposed transaction set may include at least the first CET (enclosed in the transaction package broadcasted in Step 1114).

In Step 1118, the first proposed block (received in Step 1116) is validated. Details of the block validation process are further described above with respect to FIG. 9. In brief, however, the block validation process may entail verifying a claim, by a BBG, to an aggregation of rewards (including the first CET transaction fee) for purportedly validating the one or more transactions (including the first CET) specified in the first proposed transaction set of the first proposed block. Validation of the first proposed transaction set, by a BBG, may entail employment of a consensus algorithm By way of an example, FIG. 9 outlines various steps for validating the first proposed block based on a validation of the first proposed transaction set using the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

In Step 1120, based on an outcome of the block validation process (performed in Step 1118), a determination is made as to whether the first proposed block is valid. In one embodiment of the invention, the first proposed block may be valid when the purported validation of the first proposed transaction set has been verified, whereas the first proposed block may be invalid when the purported validation of the first proposed transaction set has been unfounded. Accordingly, if it is determined that the first proposed block is valid, then the process may proceed to Step 1122. On the other hand, if it is alternatively determined that the first proposed block is invalid, then the process may alternatively proceed to Step 1182 (see e.g., FIG. 11F).

In Step 1122, after determining (in Step 1120) that the first proposed block (received in Step 1116) is valid, the first proposed block is appended or committed to a local blockchain copy (LBC). The LBC may refer to a locally stored copy of the blockchain. Upon committing to the LBC, each transaction (including the CET generated in Step 1104) in the first proposed transaction set of the first proposed block may be executed by the BVM (described above).

Figure 11C:
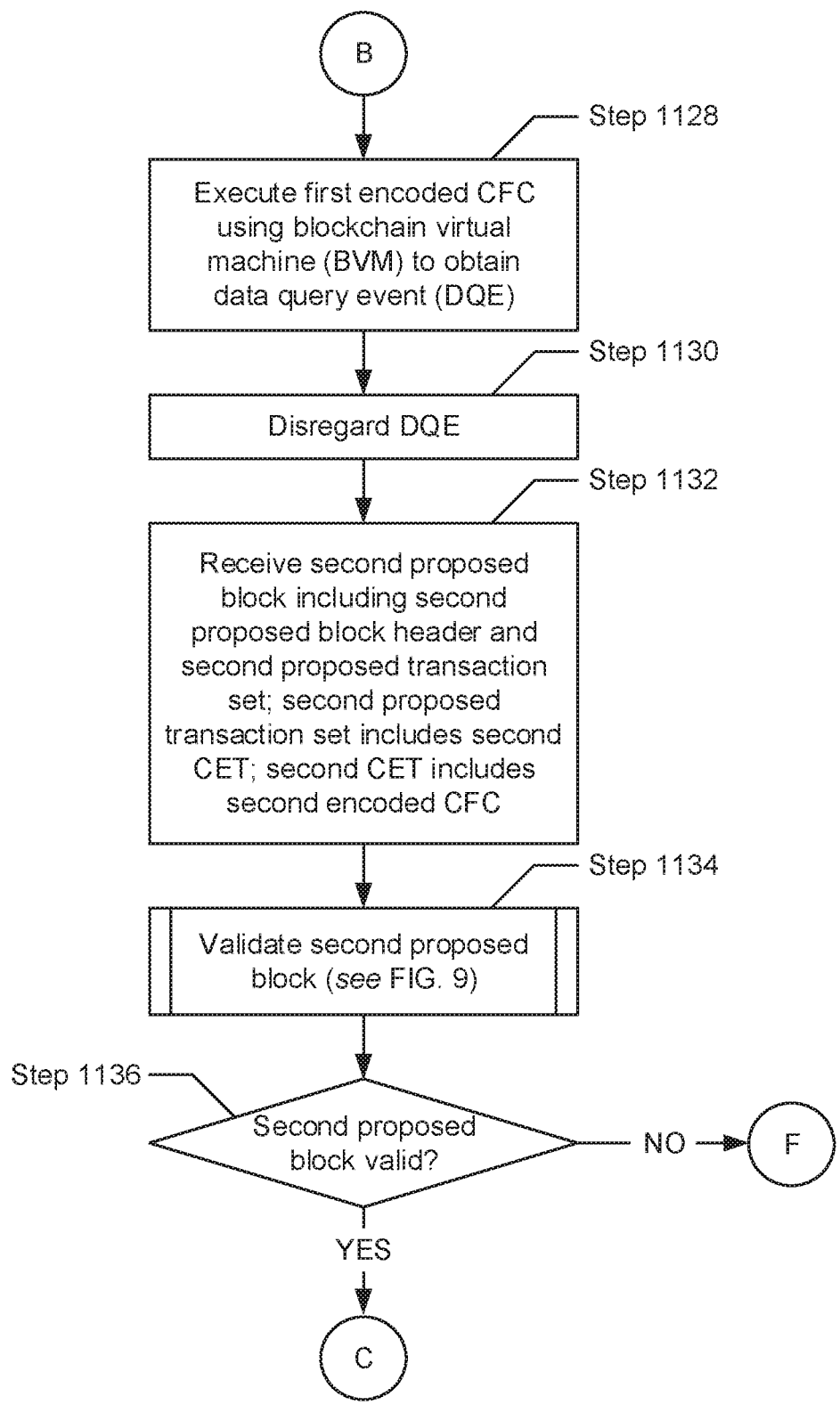

Turning to FIG. 11C, in Step 1128, in executing the CET, the first encoded CFC (enclosed therein yet obtained in Step 1102) may be executed, by the BVM, to update the state of the blockchain (e.g., the LBC) to obtain a data query event (DQE). In one embodiment of the invention, the DQE may be an action or occurrence directed to a data query, which is listened for by and relevant to the functionality of data feed services—e.g., an data feed service (DFS) (see e.g., FIG. 2D). In Step 1130, because the RRP (whom may be performing the various steps outlined in FIGS. 11A-11C) is not an DFS, the DQE (obtained in Step 1128) is irrelevant and, therefore, discarded.

In Step 1132, a second proposed block is received. In one embodiment of the invention, the second proposed block may include at least a second proposed block header and a second proposed transaction set (see e.g., FIG. 3). The second proposed block header may specify metadata pertinent to the second proposed block, whereas the second proposed transaction set may refer to a data object or structure that specifies one or more unconfirmed (or uncommitted) transactions. Further, the second proposed transaction set may include at least a second CET, which may specify at least a second encoded CFC.

In Step 1134, the second proposed block (received in Step 1132) is validated. Details of the block validation process are further described above with respect to FIG. 9. In brief, however, the block validation process may entail verifying a claim, by a BBG, to an aggregation of rewards (including the second CET transaction fee) for purportedly validating the one or more transactions (including the second CET) specified in the second proposed transaction set of the second proposed block. Validation of the second proposed transaction set, by a BBG, may entail employment of a consensus algorithm. By way of an example, FIG. 9 outlines various steps for validating the second proposed block based on a validation of the second proposed transaction set using the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

In Step 1136, based on an outcome of the block validation process (performed in Step 1134), a determination is made as to whether the second proposed block is valid. In one embodiment of the invention, the second proposed block may be valid when the purported validation of the second proposed transaction set has been verified, whereas the second proposed block may be invalid when the purported validation of the second proposed transaction set has been unfounded. Accordingly, if it is determined that the second proposed block is valid, then the process may proceed to Step 1142 (see e.g., FIG. 11D). On the other hand, if it is alternatively determined that the second proposed block is invalid, then the process may alternatively proceed to Step 1182 (see e.g., FIG. 11F).

Figure 11D:
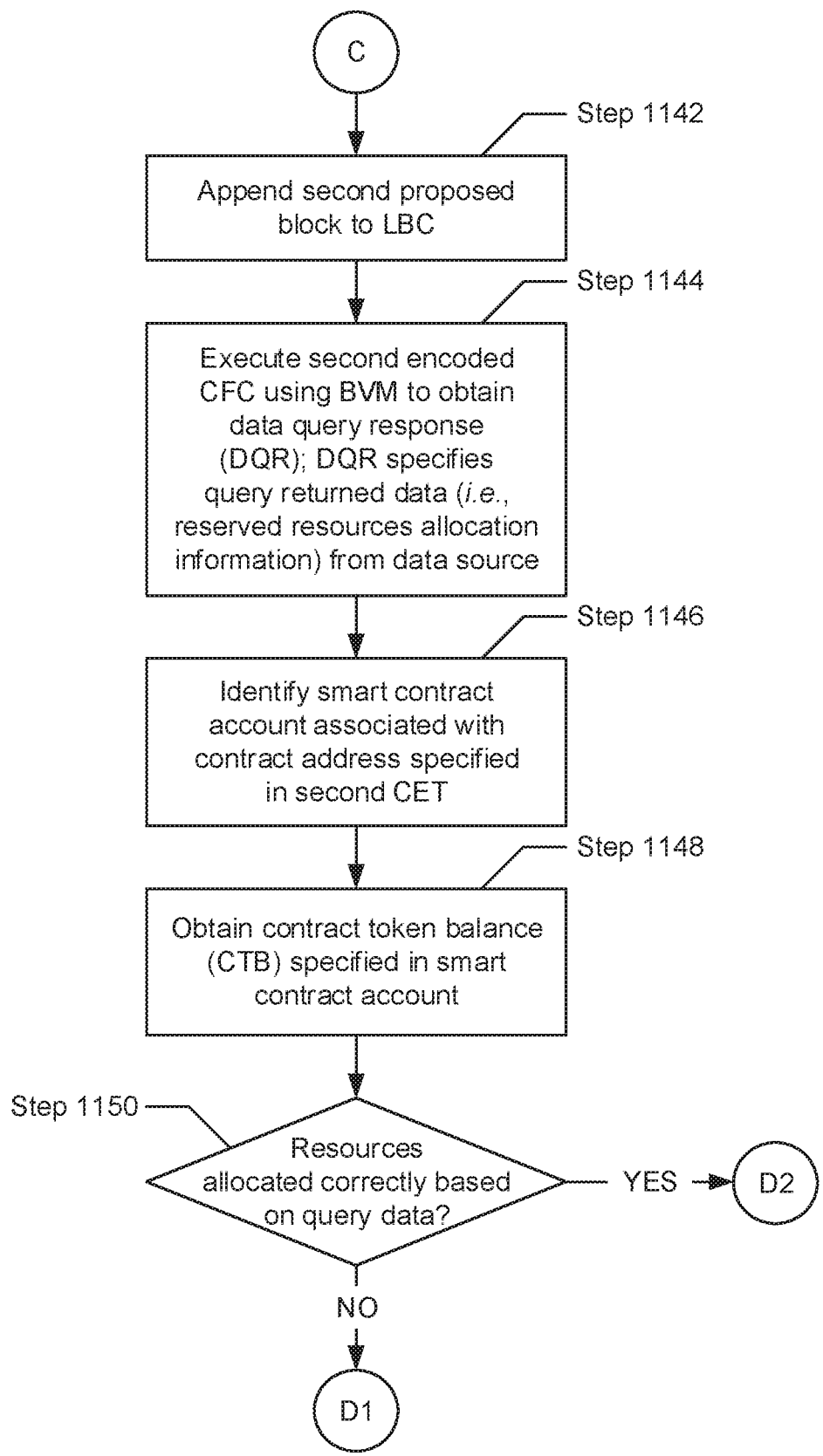

Turning to FIG. 11D, in Step 1142, after determining (in Step 1136) that the second proposed block (received in Step 1132) is valid, the second proposed block is appended or committed to the LBC. Upon committing to the LBC, each transaction (including the second CET obtained in Step 1132) in the second proposed transaction set of the second proposed block may be executed by the BVM (described above).

In Step 1144, in executing the second CET, the second encoded CFC (enclosed therein) may be executed, by the BVM, to update the state of the blockchain (e.g., the LBC) to obtain an data query response (DQR). In one embodiment of the invention, the DQR may be a data object or structure that specifies a result to the data query, posed to a data source, through execution of the first encoded CFC (in Step 1128). Accordingly, the DQR may specify query returned data provided by the data source. In one embodiment of the invention, the query returned data may entail reserved resources allocation information. Reserved resources allocation information may pertain to information pertinent to the allocation of one or more cloud environment resources from a resource provider to a resource requestor/consumer. For example, reserved resources allocation information may specify: (a) a resource requestor address (described above); (b) a resource provider address (described above); and (c) measurable quantities of one or more reserved resource types (e.g., compute resources, storage resources, network resources, and/or virtualization resources), which have been allocated to resource requestor by the resource provider.

In Step 1146, a smart contract account is identified. Specifically, the smart contract account may be identified based on a contract address that may be specified in the second CET (see e.g., FIG. 5C). Generally, in one embodiment of the invention, a contract address may refer to a unique identifier directed to a smart contract account. Hereafter, in Step 1148, a contract token balance (CTB) specified in the smart contract account (identified in Step 1146) is obtained. The CTB may refer to a digital wallet that tracks the total quantity of tokens (i.e., digital currency for the blockchain network) owned or handled by the smart contract associated with the smart contract account. In one embodiment of the invention, the CTB may hold tokens, transferred to the smart contract by a resource requestor, as a retainer for the reserved resources that may be allocated to the resource requestor by a resource provider upon enforcement of the contractual terms specified in the smart contract.

In Step 1150, based on the query returned data (specified through the DQR obtained in Step 1144)—i.e., the reserved resources allocation information, a determination is made as to whether a reserved resources subset (RRS), negotiated in the smart contract, has been allocated correctly. In one embodiment of the invention, the RRS may refer to some measurable quantity (or subset) of a total quantity available for each reserved resource type that a reserved resource requestor (RRR) sought to procure. For example, the RRS may specify that the RRR seeks to procure: twenty (20) central processing unit (CPU) cores, five-hundred (500) terabytes of persistent storage, and four (4) gigabits per second (Gbps) of network bandwidth—each of which may represent a subset of the total available reserved resources for a respective reserved resource type that may be offered by a reserved resources provider (RRP).

In one embodiment of the invention, the RRS may be allocated correctly based on the reserved resources allocation information specifying measurable quantities of one or more reserved resource types (e.g., compute resources, storage resources, network resources, and/or virtualization resources) that match the reserved resource quantities specified in the RRS. Conversely, the RRS may be allocated incorrectly based on the reserved resources allocation information specifying measurable quantities of one or more reserved resource types that mismatch the reserved resource quantities specified in the RRS. Accordingly, if it is determined that the RRS has been allocated correctly, a recompense action entailing providing a token payment for resources (TPR) (described) to the RRP may be triggered, and the process may subsequently proceed to Step 1158 (see e.g., FIG. 11E). On the other hand, if it is alternatively determined that the RRS has been allocated incorrectly, a remedial action entailing reimbursement of the TPR back to the RRR may be triggered, and the process may subsequently proceed to Step 1156 (see e.g., FIG. 11E).

Figure 11E:
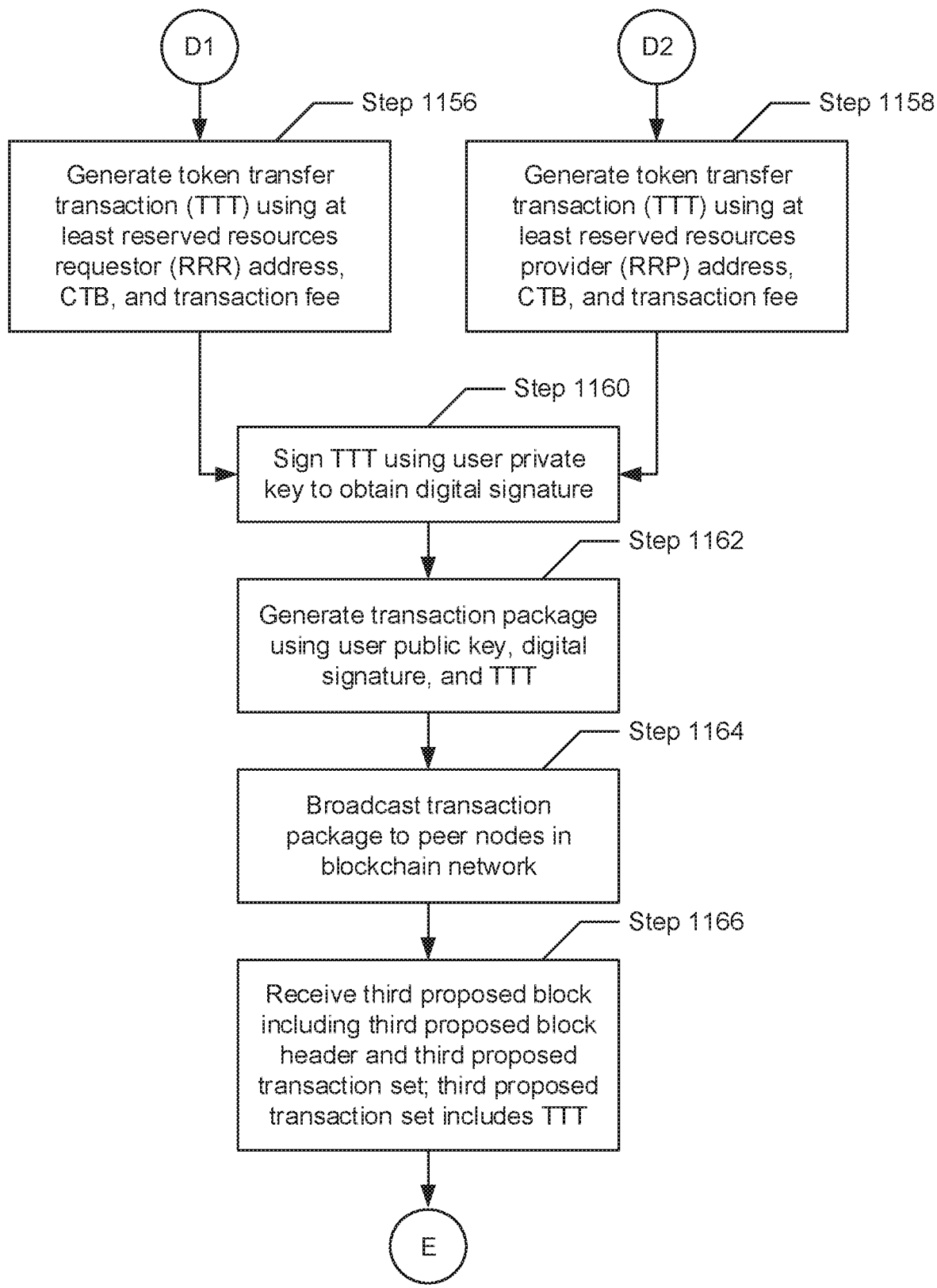

Turning to FIG. 11E, in Step 1156, after determining (in Step 1150) that the RRS, negotiated in the smart contract, has been allocated incorrectly, a token transfer transaction (TTT) (see e.g., FIG. 5A) is generated. In one embodiment of the invention, the TTT may refer to a transaction type that serves to transfer tokens (i.e., a digital currency of the blockchain network) between blockchain node users. In the present scenario, the blockchain node users involved may include a reserved resource requestor (RRR) (see e.g., FIG. 2B) and a reserved resource provider (RRP) (see e.g., FIG. 2A). Furthermore, the TTT may be a data object or structure that may specify at least a RRR address, the CTB (obtained in Step 1148), and a transaction fee. The RRR address may refer to a unique identifier directed to a resource requesting user account, where the resource requesting user account may be associated with the RRR. The transaction fee, on the other hand, may refer to a reward, expressed in tokens, which incentivizes other blockchain nodes on the blockchain network to validate the TTT, thereby committing the TTT, along with the transfer of the CTB from the smart contract account to the resource requesting user account, into the blockchain.

Alternatively, in Step 1158, after determining (in Step 1150) that the RRS, negotiated in the smart contract, has been allocated correctly, another TTT is generated. In one embodiment of the invention, this TTT may specify at least a RRP address, the CTB (obtained in Step 1148), and the transaction fee. The RRP address may refer to a unique identifier directed to a resource providing user account, where the resource providing user account may be associated with the RRP. Similarly, the transaction fee may refer to a reward, expressed in tokens, which incentivizes other blockchain nodes on the blockchain network to validate this TTT, thereby committing this TTT, along with the transfer of the CTB from the smart contract account to the resource providing user account, into the blockchain.

In Step 1160, following the generation of the TTT (in Step 1156 or 1158), the TTT is signed. In one embodiment of the invention, signing of the TTT may entail cryptographically encrypting the TTT using a user private key (described above), associated with the RRP to obtain a digital signature. The digital signature may refer to an encrypted hash of the TTT. In Step 1162, a transaction package is generated using at least the digital signature (obtained in Step 1160) and the TTT (generated in Step 1156 or 1158). Further, in one embodiment of the invention, the transaction package may further be generated using a user public key (described above) associated with the RRP. In another embodiment of the invention, the user public key may have been published to the blockchain network some time prior to the triggering of the method disclosed through FIGS. 11A-11F. Moreover, the transaction package may refer to a data object or structure that may encode the TTT, the digital signature, and, optionally, the user public key, to a more transmission-facilitating format.

In Step 1164, the transaction package (generated in Step 1162) is broadcasted to one or more peer nodes in the blockchain network. In one embodiment of the invention, a peer node may refer to a blockchain node (of a subset of blockchain nodes in the blockchain network) with which the RRP (whom may be performing the various steps of FIGS. 11A-11F) directly communicates. Further, a peer node may refer to any blockchain node within a specified next-hop cost away from the RRP in a blockchain network topology. Each peer node subsequently propagates the broadcast to their respective peer nodes, and so on, until all blockchain nodes in the blockchain network receive the transaction package (generated in Step 1162).

In Step 1166, a third proposed block is received. In one embodiment of the invention, a proposed block may refer to an uncommitted blockchain block, which may have been broadcasted by a blockchain block generator (BBG) (see e.g., FIG. 2C). The third proposed block may include at least a third proposed block header and a third proposed transaction set (see e.g., FIG. 3). The third proposed block header may specify metadata pertinent to the third proposed block, whereas the third proposed transaction set may refer to a data object or structure that specifies one or more unconfirmed (or uncommitted) transactions. Further, the third proposed transaction set may include at least the TTT (enclosed in the transaction package broadcasted in Step 1164).

Figure 11F:
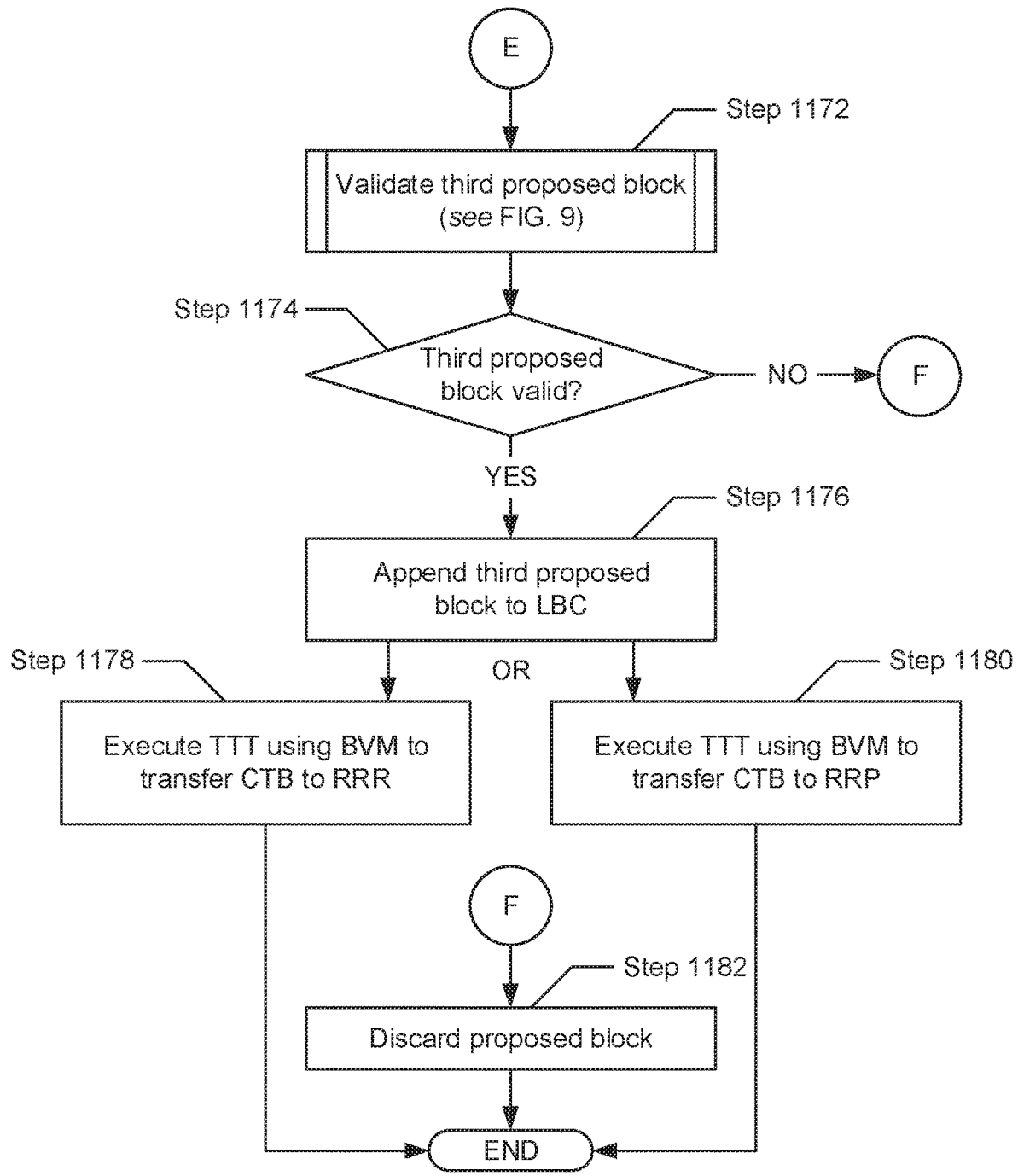

Turning to FIG. 11F, in Step 1172, the third proposed block (received in Step 1166) is validated. Details of the block validation process are further described above with respect to FIG. 9. In brief, however, the block validation process may entail verifying a claim, by a BBG, to an aggregation of rewards (including the TTT transaction fee) for purportedly validating the one or more transactions (including the TTT) specified in the third proposed transaction set of the third proposed block. Validation of the third proposed transaction set, by a BBG, may entail employment of a consensus algorithm. By way of an example, FIG. 9 outlines various steps for validating the third proposed block based on a validation of the third proposed transaction set using the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

In Step 1174, based on an outcome of the block validation process (performed in Step 1172), a determination is made as to whether the third proposed block is valid. In one embodiment of the invention, the third proposed block may be valid when the purported validation of the third proposed transaction set has been verified, whereas the third proposed block may be invalid when the purported validation of the third proposed transaction set has been unfounded. Accordingly, if it is determined that the third proposed block is valid, then the process may proceed to Step 1176. On the other hand, if it is alternatively determined that the third proposed block is invalid, then the process may alternatively proceed to Step 1182.

In Step 1176, after determining (in Step 1174) that the third proposed block (received in Step 1166) is valid, the third proposed block is appended or committed to the LBC. The LBC may refer to a locally stored copy of the blockchain. Upon committing to the LBC, each transaction (including the TTT generated in Step 1156 or 1158) in the third proposed transaction set of the third proposed block may be executed by the BVM (described above). Hereinafter, the process may proceed to either Step 1178 if the TTT had been generated per Step 1156, or Step 1180 if the TTT had been generated per Step 1158.

In Step 1178, the TTT (generated in Step 1156) is executed, by the BVM, to update the state of the blockchain (e.g., the LBC) to transfer the CTB (obtained in Step 1148) to the network user account associated with the RRR. In one embodiment of the invention, transfer of the CTB to the RRR may reference a remedial action triggered because the RRS, negotiated in the smart contract, had been allocated incorrectly, thereby entailing reimbursement of the TPR back to the RRR.

Alternatively, in Step 1180, the TTT (generated in Step 1158) is executed, by the BVM, to update the state of the blockchain to transfer the CTB (obtained in Step 1148) to the network user account associated with the RRP. In one embodiment of the invention, transfer of the CTB to the RRP may reference a recompense action triggered because the RRS, negotiated in the smart contract, had been allocated correctly, thereby releasing the TPR to the RRP.

In Step 1182, after determining (in Steps 1120, 1136, or 1174) that the first, second, or third proposed blocks, respectively, are invalid, the first/second/third proposed block is discarded.

Figure 12A:
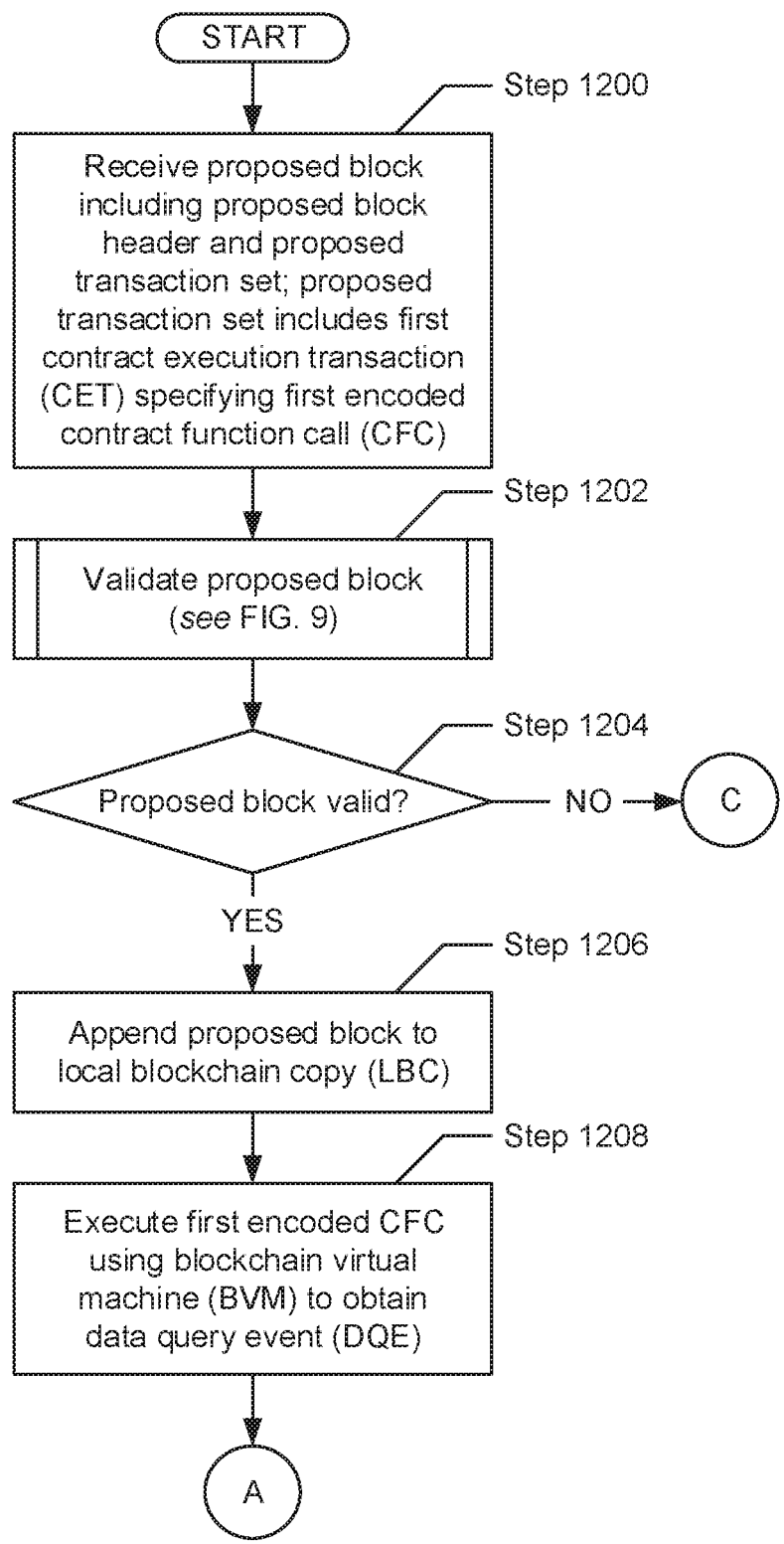
FIGS. 12A-12C show flowcharts describing a method for processing a smart contract query in accordance with one or more embodiments of the invention.
Figure 12B:
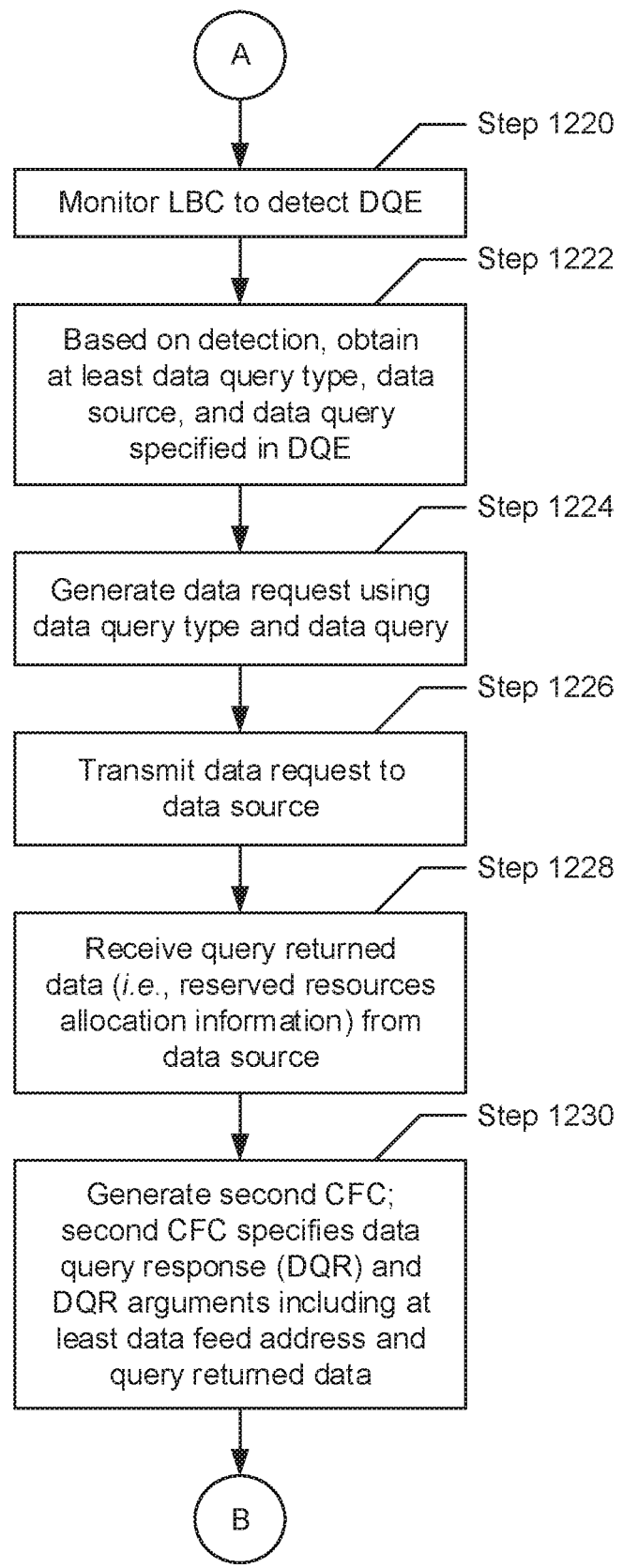
Figure 12C:
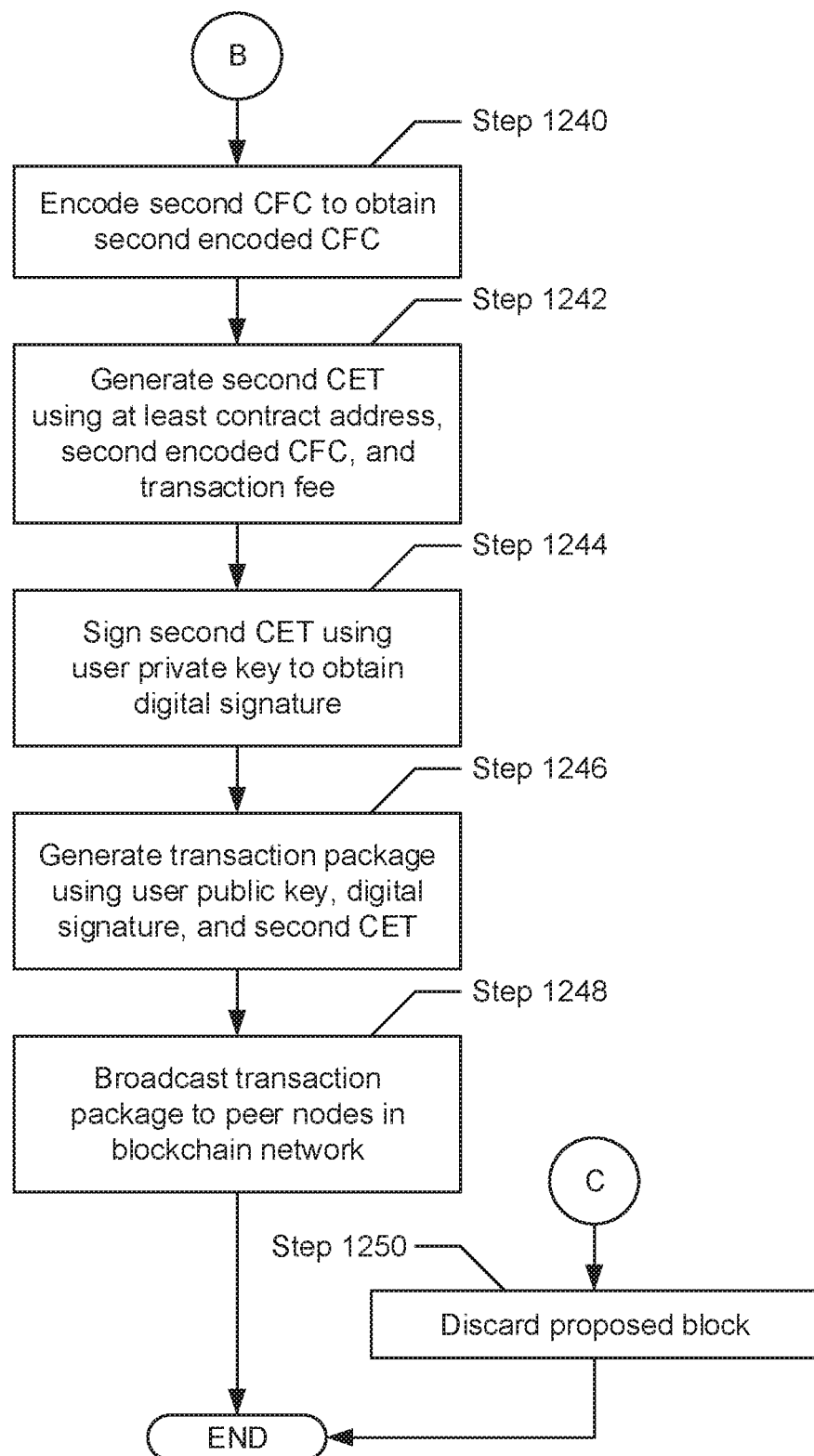

FIGS. 12A-12C show flowcharts describing a method for processing a smart contract query in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 12A-12C may be performed in parallel with any other steps shown in FIGS. 8A-11F without departing from the scope of the invention.

Turning to FIG. 12A, in Step 1200, a proposed block is received. In one embodiment of the invention, a proposed block may refer to an uncommitted blockchain block, which may have been broadcasted by a blockchain block generator (BBG) (see e.g., FIG. 2C). The proposed block may include at least a proposed block header and a proposed transaction set (see e.g., FIG. 3). The proposed block header may specify metadata pertinent to the proposed block, whereas the proposed transaction set may refer to a data object or structure that specifies one or more unconfirmed (or uncommitted) transactions. Further, the proposed transaction set may include at least a first contract execution transaction (CET) (see e.g., FIG. 5C), where the first CET may specify a first encoded contract function call (CFC).

In one embodiment of the invention, a CFC may be an expression that passes control, along with one or more arguments/parameters, to a subroutine of an already created smart contract. By way of an example, assuming a smart contract includes a subroutine or function named "myFunction", which may specify a set of instructions to perform a task, and that requires a first parameter "param1" and a second parameter "param2": a respective CFC directed to calling the subroutine may resemble the expression "myFunction(param1, param2)". By way of another example, if the aforementioned subroutine were to return any value, where the returned value can be stored in a defined variable "myValue": a respective CFC directed to calling the subroutine may resemble the expression "myValue=myFunction(param1, param2)" Furthermore, an encoded CFC may refer to a hex-encoded conversion of the aforementioned expression—i.e., a CFC expressed as a hexadecimal character string.

In Step 1202, the proposed block (received in Step 1200) is validated. Details of the block validation process are further described above with respect to FIG. 9. In brief, however, the block validation process may entail verifying a claim, by a BBG, to an aggregation of rewards (including a first CET transaction fee) for purportedly validating the one or more transactions (including the first CET) specified in the proposed transaction set of the proposed block. Validation of the proposed transaction set, by a BBG, may entail employment of a consensus algorithm By way of an example, FIG. 9 outlines various steps for validating the proposed block based on a validation of the proposed transaction set using the proof-of-work (PoW) consensus model. However, one of ordinary skill will appreciate that the invention may be practiced using other consensus algorithms, which may include, but are not limited to: the proof-of-stake (PoS) consensus model, the proof-of-burn (PoB) consensus model, the proof-of-importance (PoI) consensus model, the proof-of-stake-velocity (PoSV) consensus model, the proof-of-capacity (PoC) consensus model, or the proof-of-deposit (PoD) consensus model.

In Step 1204, based on an outcome of the block validation process (performed in Step 1202), a determination is made as to whether the proposed block is valid. In one embodiment of the invention, the proposed block may be valid when the purported validation of the proposed transaction set has been verified, whereas the proposed block may be invalid when the purported validation of the proposed transaction set has been unfounded. Accordingly, if it is determined that the proposed block is valid, then the process may proceed to Step 1206. On the other hand, if it is alternatively determined that the proposed block is invalid, then the process may alternatively proceed to Step 1250 (see e.g., FIG. 12C).

In Step 1206, after determining (in Step 1204) that the proposed block (received in Step 1200) is valid, the proposed block is appended or committed to a local blockchain copy (LBC). The LBC may refer to a locally stored copy of the blockchain. Upon committing to the LBC, each transaction (including the first CET obtained in Step 1200) in the proposed transaction set of the proposed block may be executed by the BVM (described above).

In Step 1208, in executing the first CET, the first encoded CFC (enclosed therein) may be executed, by the BVM, to update the state of the blockchain (e.g., the LBC) to obtain a data query event (DQE). In one embodiment of the invention, the DQE may be an action or occurrence directed to a data query, which is listened for by and relevant to the functionality of data feed services—e.g., an data feed service (DFS) (see e.g., FIG. 2D) (whom may substantively be performing the various steps outlined in FIGS. 12A-12C).

Turning to FIG. 12B, in Step 1220, the blockchain (or LBC) is continually monitored for smart contract events—e.g., the DQE. Furthermore, with the emittance of the DQE as a result of executing the first encoded CFC (in Step 1208), the DQE is detected. Based on the detection, in Step 1222, arguments or parameters, accompanying the DQE, is retrieved. In one embodiment of the invention, these arguments/parameters may include, but are not limited to: a data query type, a data source, and a data query.

In one embodiment of the invention, the data query type may reference a classification of the data query. By way of examples, the data query type may specify: (a) a uniform resource locator (URL) type, which pertains to a data query directed to any webpage or hypertext transfer protocol (HTTP) application programming interface (API) endpoint; (b) a WolframAlpha type, which pertains to a data query directed to the WolframAlpha computational engine; (c) a interplanetary file system (IPFS) type, which pertains to a data query directed to any content stored on an IPFS file; and (d) a random type, which pertains to a data query directed to any secure application providing random bytes generation.

In one embodiment of the invention, the data source may refer to a trusted provider of information. By way of an example, the data source may be a website or a web API accessible through an assigned web address—i.e., a URL. By way of another example, the data source may be a virtual machine executing on the cloud accessible through an Internet Protocol (IP) address. By way of yet another example, the data source may be another smart contract committed into the blockchain accessible through a contract address associated with the other smart contract. Furthermore, in one embodiment of the invention, the data query may reference the information being sought. Said another way, the data query may be an inquiry directed to the data source, which the data source may understand in order to provide the information being sought.

In Step 1224, a data request is generated. In one embodiment of the invention, the data request may be generated using at least the data query type and the data query (obtained in Step 1222). Thereafter, in Step 1226, the data request (generated in Step 1224) is subsequently transmitted to the data source (specified in Step 1222)—i.e., a web API that may grant access to a reserved resources manager (RRM) on a reserved resources provider (RRP) (see e.g., FIG. 2A). Upon receiving the data query, the RRM may process the data query to obtain and subsequently transmit a response encompassing reserved resources allocation information.

In Step 1228, the above-mentioned RRM response, in the form of query returned data that encompasses the reserved resources allocation information, is received. In one embodiment of the invention, reserved resources allocation information may pertain to information pertinent to the allocation of one or more cloud environment resources from a resource provider to a resource requestor/consumer. For example, reserved resources allocation information may specify: (a) a resource requestor address (described above); (b) a resource provider address (described above); and (c) measurable quantities of one or more reserved resource types (e.g., compute resources, storage resources, network resources, and/or virtualization resources), which have been allocated to resource requestor by the resource provider.

In Step 1230, a second CFC is generated. In one embodiment of the invention, the second CFC may pertain to an data query response (DQR)—i.e., a reply directed to the DQE (detected in Step 1220). Further, the DQR may specify a set of DQR arguments that include, but are not limited to, a data feed address and the query returned data (obtained in Step 1228). The data feed address may refer to a unique identifier directed to a network user account with which the DFS (whom may be substantively performing the steps outlined in FIGS. 12A-12C) is associated.

Turning to FIG. 12C, in Step 1240, the second CFC (generated in Step 1230) is encoded to obtain a second encoded CFC. In one embodiment of the invention, encoding the second CFC may entail converting the second CFC—i.e., an alphanumeric expression—to a hexadecimal character string.

In Step 1242, a second CET (see e.g., FIG. 5C) is generated. In one embodiment of the invention, the second CET may be a data object or structure that may specify at least a contract address, the second encoded CFC (obtained in Step 1240), and a transaction fee. In one embodiment of the invention, the contract address may refer to a unique identifier directed to a smart contract account, which may be associated with the smart contract that had sought the reserved resources allocation information (obtained in 1228). Moreover, the transaction fee may refer to a reward, expressed in tokens, which incentivizes other blockchain nodes on the blockchain network to validate the second CET, thereby committing the secocond CET, along with the call to the DQF (i.e., a smart contract event) (specified in Step 1230), into the blockchain.

In Step 1244, the second CET (generated in Step 1242) is signed. In one embodiment of the invention, signing of the second CET may entail cryptographically encrypting the second CET using a user private key (described above), associated with DFS, to obtain a digital signature. The digital signature may refer to an encrypted hash of the second CET. In Step 1246, a transaction package is generated using at least the digital signature (obtained in Step 1244) and the second CET (generated in Step 1242). Further, in one embodiment of the invention, the transaction package may further be generated using a user public key (described above) associated with the DFS. In another embodiment of the invention, the user public key may have been published to the blockchain network some time prior to the triggering of the method disclosed through FIGS. 12A-12C. Moreover, the transaction package may refer to a data object or structure that may encode the second CET, the digital signature, and, optionally, the user public key, to a more transmission-facilitating format.

In Step 1248, the transaction package (generated in Step 1248) is broadcasted to one or more peer nodes in the blockchain network. In one embodiment of the invention, a peer node may refer to a blockchain node (of a subset of blockchain nodes in the blockchain network) with which the DFS (whom may be performing the various steps of FIGS. 12A-12C) directly communicates. Further, a peer node may refer to any blockchain node within a specified next-hop cost away from the DFS in a blockchain network topology. Each peer node subsequently propagates the broadcast to their respective peer nodes, and so on, until all blockchain nodes in the blockchain network receive the transaction package (generated in Step 1248).

In Step 1250, after determining (in Step 1204) that the proposed block (received in Step 1200) is invalid, the proposed block is discarded.

Figure 13:
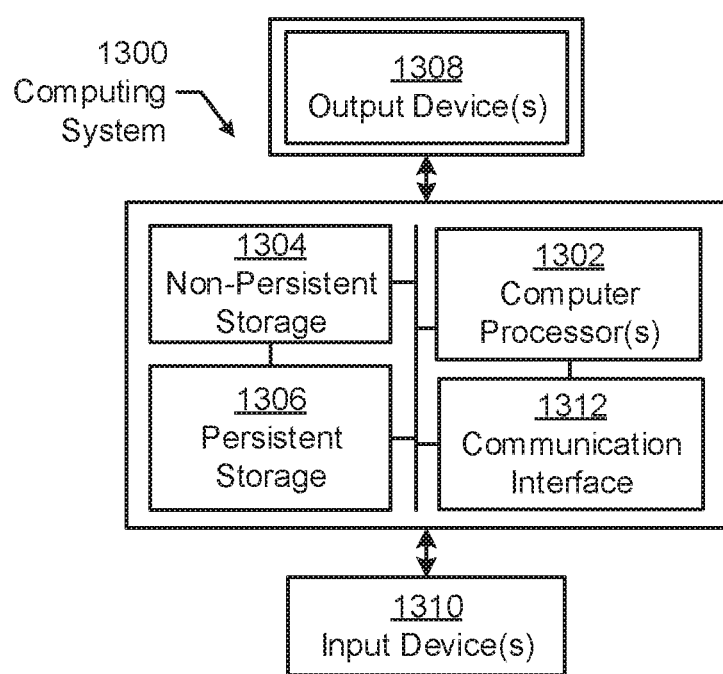
FIG. 13 shows a computing system in accordance with one or more embodiments of the invention.

FIG. 13 shows a computing system in accordance with one or more embodiments of the invention. The computing system (1300) may include one or more computer processors (1302), non-persistent storage (1304) (e.g., volatile memory, such as random access memory (RAM), cache memory), persistent storage (1306) (e.g., a hard disk, an optical drive such as a compact disk (CD) drive or digital versatile disk (DVD) drive, a flash memory, etc.), a communication interface (1312) (e.g., Bluetooth interface, infrared interface, network interface, optical interface, etc.), input devices (1310), output devices (1308), and numerous other elements (not shown) and functionalities. Each of these components is described below.

In one embodiment of the invention, the computer processor(s) (1302) may be an integrated circuit for processing instructions. For example, the computer processor(s) may be one or more cores or micro-cores of a processor. The computing system (1300) may also include one or more input devices (1310), such as a touchscreen, keyboard, mouse, microphone, touchpad, electronic pen, or any other type of input device. Further, the communication interface (1312) may include an integrated circuit for connecting the computing system (1300) to a network (not shown) (e.g., a local area network (LAN), a wide area network (WAN) such as the Internet, mobile network, or any other type of network) and/or to another device, such as another computing device.

In one embodiment of the invention, the computing system (1300) may include one or more output devices (1308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1302), non-persistent storage (1304), and persistent storage (1306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enforcing smart contracts, comprising:
   receiving a first proposed block comprising a first proposed block header and a first proposed transaction set, wherein the first proposed transaction set comprises a first contract execution transaction (CET) that comprises a first encoded contract function call (CFC);
   making a first determination, based on a performing of a block validation process on the first proposed block, that the first proposed block is valid, wherein performing of the block validation process on the first proposed block, comprises:
      extracting, from the first proposed block header, a target criterion for the first proposed block;
      hashing at least a portion of the first proposed block header to obtain a proposed block hash;
      determining that the proposed block hash satisfies the target criterion; and
      identifying the first proposed block as valid based on the proposed block hash satisfying the target criterion;
   committing, based on the first determination, the first proposed block into a local blockchain copy (LBC);
   in response to committing the first proposed block, executing the first encoded CFC to obtain a data query response (DQR), wherein the DQR comprises reserved resources allocation information; and
   enforcing a smart contract based at least on the reserved resources allocation information, wherein enforcing the smart contract based at least on the reserved resources allocation information, comprises:
      obtaining a contract address specified in the first CET;
      identifying a smart contract account associated with the contract address, wherein the smart contract is associated with the smart contract account;
      retrieving, from the smart contract account, a contract token balance (CTB) specified therein;
      generating a transaction package based on the CTB; and
      broadcasting the transaction package to a set of peer blockchain nodes in a blockchain network.

2. The method of claim 1, wherein a first CFC is an expression that passes control and a set of arguments to a subroutine of the smart contract, wherein the first encoded CFC is a hexadecimal encoding of the first CFC.

3. The method of claim 1, wherein the reserved resources allocation information is information detailing an allocation of at least one reserved resource type from a reserved resource provider (RRP) to a reserved resource requestor (RRR).

4. The method of claim 3, wherein the smart contract comprises a contractual term negotiated between the RRP and the RRR, wherein the contractual term is implemented as a subroutine that uses at least the reserved resources allocation information to enforce the contractual term.

5. The method of claim 1, wherein generating the transaction package based on the CTB comprises:

making a second determination, based at least one the reserved resources allocation information, that a reserved resources subset (RRS) has been allocated correctly;

generating, based on the second determination, a token transfer transaction (TTT) using at least a reserved resources provider (RRP) address, the CTB, and a transaction fee;

signing, using a user private key, the TTT to obtain a digital signature; and generating the transaction package using at least the TTT and the digital signature.

6. The method of claim 5, wherein making the second determination, comprises:

obtaining the RRS specified in the smart contract;

obtaining an allocation of at least one reserved resource type detailed in the reserved resources allocation information;

making a third determination that the allocation of at least one reserved resource type matches the RRS; and making the second determination based on the third determination.

7. The method of claim 5, wherein the transaction package is further generated using a user public key.

8. The method of claim 5, further comprising:

receiving a second proposed block comprising a second proposed block header and a second proposed transaction set, wherein the second proposed transaction set comprises the TTT;

making a third determination, based on the performing of the block validation process on the second proposed block, that the second proposed block is valid;

committing, based on the third determination, the second proposed block into the LBC; and in response to committing the second proposed block, executing the TTT to trigger a recompense action.

9. The method of claim 8, wherein the recompense action comprises transferring the CTB to a network user account associated with a RRP, wherein the RRP address is directed to the network user account.

10. The method of claim 5, further comprising:

receiving a second proposed block comprising a second proposed block header and a second proposed transaction set, wherein the second proposed transaction set comprises the TTT;

making a third determination, based on the performing of the block validation process on the second proposed block, that the second proposed block is valid;

committing, based on the third determination, the second proposed block into the LBC; and in response to committing the second proposed block, executing the TTT to trigger a remedial action.

11. The method of claim 10, wherein the remedial action comprises transferring the CTB to a network user account associated with a RRR, wherein the RRR address is directed to the network user account.

12. The method of claim 1, generating the transaction package based on the CTB comprises:

making a second determination, based at least one the reserved resources allocation information, that a reserved resources subset (RRS) has been allocated incorrectly;

generating, based on the second determination, a token transfer transaction (TTT) using at least a reserved resources requestor (RRR) address, the CTB, and a transaction fee;

signing, using a user private key, the TTT to obtain a digital signature; and generating the transaction package using at least the TTT and the digital signature.

13. The method of claim 12, wherein making the second determination, comprises:

obtaining the RRS specified in the smart contract;

obtaining an allocation of at least one reserved resource type detailed in the reserved resources allocation information;

making a third determination that the allocation of at least one reserved resource type mismatches the RRS; and making the second determination based on the third determination.

14. A blockchain network, comprising:

a plurality of blockchain nodes comprising a first blockchain node apprising a first role as a reserved resource provider (RRP) and a second blockchain node apprising a second role as a data feed service (DFS), wherein the first blockchain node comprises a processor coupled to a memory that is programmed to:

receive, broadcasted from the second blockchain node, a first proposed block comprising a first proposed block header and a first proposed transaction set, wherein the first proposed transaction comprises a first contract execution transaction (CET) that comprises a first encoded contract function call (CFC);

make a first determination, based on a performing of a block validation process on the first proposed block, that the first proposed block is valid, wherein performing of the block validation process on the first proposed block, comprises:

extracting, from the first proposed block header, a target criterion for the first proposed block;

hashing at least a portion of the first proposed block header to obtain a proposed block hash;

determining that the proposed block hash satisfies the target criterion; and identifying the first proposed block as valid based on the proposed block hash satisfying the target criterion;

commit, based on the first determination, the first proposed block into a local blockchain copy (LBC) residing on the first blockchain node;

in response to committing the first proposed block, execute the first encoded CFC to obtain a data query response (DQR), wherein the DQR comprises reserved resources allocation information; and enforce a smart contract based at least on the reserved resources allocation information, wherein enforcing the smart contract based at least on the reserved resources allocation information, comprises:

obtaining a contract address specified in the first CET;

identifying a smart contract account associated with the contract address, wherein the smart contract is associated with the smart contract account;

retrieving, from the smart contract account, a contract token balance (CTB) specified therein;

generating a transaction package based on the CTB; and broadcasting the transaction package to a set of peer blockchain nodes in a blockchain network.

15. The blockchain network of claim 14, further comprising:

a third blockchain node, in the blockchain network, apprising a third role as a reserved resource requestor (RRR), wherein enforcing the smart contract triggers a remedial action directed to the RRR.

16. The blockchain network of claim 14, further comprising:
a third blockchain node, in the blockchain network, apprising a third role as a blockchain block generator (BBG).

17. The blockchain network of claim 14, wherein the first blockchain node comprises at least one reserved resource type and a reserved resources manager (RRM), wherein the RRM is programmed to manage allocation of the at least one reserved resource type to derive the reserved resources allocation information.

18. The blockchain network of claim 17, wherein the at least one reserved resource type is at least one selected from a group consisting of a reserved compute resource (RCR), a reserved storage resource (RSR), a reserved network resource (RNR), and a reserved virtualization resource (RVR).

19. A non-transitory computer readable medium (CRM) comprising computer readable program code, which when executed by a computer processor, enables the computer processor to:
receive a first proposed block comprising a first proposed block header and a first proposed transaction set, wherein the first proposed transaction comprises a first contract execution transaction (CET) that comprises a first encoded contract function call (CFC);
make a first determination, based on a performing of a block validation process on the first proposed block, that the first proposed block is valid, wherein performing of the block validation process on the first proposed block, comprises:
extracting, from the first proposed block header, a target criterion for the first proposed block;
hashing at least a portion of the first proposed block header to obtain a proposed block hash;
determining that the proposed block hash satisfies the target criterion; and
identifying the first proposed block as valid based on the proposed block hash satisfying the target criterion;
commit, based on the first determination, the first proposed block into a local blockchain copy (LBC);
in response to committing the first proposed block, execute the first encoded CFC to obtain a data query response (DQR), wherein the DQR comprises reserved resources allocation information; and
enforce a smart contract based at least on the reserved resources allocation information, wherein enforcing the smart contract based at least on the reserved resources allocation information, comprises:
obtaining a contract address specified in the first CET;
identifying a smart contract account associated with the contract address, wherein the smart contract is associated with the smart contract account;
retrieving, from the smart contract account, a contract token balance (CTB) specified therein;
generating a transaction package based on the CTB; and
broadcasting the transaction package to a set of peer blockchain nodes in a blockchain network.

* * * * *

UNITED STATES PATENT AND TRADEMARK OFFICE
CERTIFICATE OF CORRECTION

PATENT NO. : 10,833,865 B2
APPLICATION NO. : 15/966381
DATED : November 10, 2020
INVENTOR(S) : John Kelly Page 1 of 1

It is certified that error appears in the above-identified patent and that said Letters Patent is hereby corrected as shown below:

In the Claims

Claim 5, Column 37, Line 1, the words "based at least one", should read --based at least on--.

Claim 12, Column 37, Line 60, the words "based at least one", should read --based at least on--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*